United States Patent
Chern

(10) Patent No.: US 12,487,398 B2
(45) Date of Patent: Dec. 2, 2025

(54) BYPASS WAVGUIDE CONFIGURED TO FACILITATE INTER-LEVEL OPTICAL COUPLING IN OPTICAL MODULE

(71) Applicant: Taiwan Semiconductor Manufacturing Company, Ltd., Hsinchu (TW)

(72) Inventor: Chan-Hong Chern, Palo Alto, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 300 days.

(21) Appl. No.: 18/191,319

(22) Filed: Mar. 28, 2023

(65) Prior Publication Data

US 2024/0329297 A1    Oct. 3, 2024

(51) Int. Cl.
  *G02B 6/12*    (2006.01)
  *G02B 6/122*   (2006.01)
  *G02B 6/125*   (2006.01)

(52) U.S. Cl.
  CPC ..... *G02B 6/12002* (2013.01); *G02B 6/12016* (2013.01); *G02B 6/1228* (2013.01); *G02B 6/125* (2013.01); *G02B 2006/12107* (2013.01)

(58) Field of Classification Search
  CPC .................. G02B 6/125; G02B 6/12016
  See application file for complete search history.

(56) References Cited

U.S. PATENT DOCUMENTS

| 5,357,590 A * | 10/1994 | Auracher ............. G02B 6/4204 385/35 |
| 7,587,106 B2 * | 9/2009 | Piede ..................... G02B 6/125 385/14 |
| 9,341,776 B2 | 5/2016 | Iizuka et al. |
| 9,372,317 B1 | 6/2016 | Feng |
| 10,067,305 B2 | 9/2018 | Feng |
| 10,610,087 B2 | 4/2020 | Hu et al. |
| 10,895,681 B2 | 1/2021 | Watanuki et al. |
| 11,467,341 B2 * | 10/2022 | Bian .................... G02B 6/2813 |
| 2002/0136494 A1 * | 9/2002 | Yazaki .............. G02B 6/12002 385/37 |

(Continued)

FOREIGN PATENT DOCUMENTS

JP    2006038897 A    2/2006

*Primary Examiner* — Charlie Y Peng
(74) *Attorney, Agent, or Firm* — Eschweiler & Potashnik, LLC

(57) ABSTRACT

Various embodiments of the present disclosure are directed towards an optical module including a first waveguide and a bypass waveguide. The first waveguide laterally extends in a first direction. The first waveguide comprises a first waveguide body segment and a first waveguide coupler structure. A transverse waveguide laterally extends in a second direction different from the first direction. A first dielectric layer is disposed over the first waveguide and the transverse waveguide. A bypass waveguide overlies the first dielectric layer and laterally extends in the first direction. The bypass waveguide comprises a bypass body segment and a first bypass coupler structure. At least a portion of the first bypass coupler structure overlies the first waveguide coupler structure. The bypass body segment overlies at least a portion of the transverse waveguide.

20 Claims, 23 Drawing Sheets

(56) References Cited

U.S. PATENT DOCUMENTS

| | | | |
|---|---|---|---|
| 2004/0037497 A1* | 2/2004 | Lee | G02B 6/132 |
| | | | 385/28 |
| 2004/0258361 A1* | 12/2004 | Telkamp | G02B 6/125 |
| | | | 385/39 |
| 2006/0171626 A1 | 8/2006 | McNie et al. | |
| 2011/0013269 A1 | 1/2011 | Ogawa et al. | |
| 2016/0327737 A1 | 11/2016 | Zhang et al. | |

* cited by examiner

1800a

1800b

2400 ↘

| Provide a semiconductor-on-insulator (SOI) having a first layer separated from a substrate by an insulator layer | ─ 2402 |

↓

| Pattern the first layer to form a plurality of waveguides laterally extending in a first direction and a plurality of transverse waveguides laterally extending in a second direction different from the first direction, where the plurality of waveguides respectively comprise a waveguide coupler structure abutting a waveguide body segment | ─ 2404 |

↓

| Deposit a first dielectric layer over the plurality of waveguides and the plurality of transverse waveguides | ─ 2406 |

↓

| Deposit a second layer over the first dielectric layer | ─ 2408 |

↓

| Pattern the second layer to form a plurality of bypass waveguides laterally extending in the first direction and overlying the plurality of waveguides and the plurality of transverse waveguides, where the plurality of bypass waveguides respectively comprise at least one bypass waveguide abutting a bypass body segment and directly overlying a corresponding waveguide coupler structure of an underlying waveguide | ─ 2410 |

↓

| Form a second dielectric layer over the plurality of bypass waveguides | ─ 2412 |

Fig. 24

BYPASS WAVGUIDE CONFIGURED TO FACILITATE INTER-LEVEL OPTICAL COUPLING IN OPTICAL MODULE

BACKGROUND

Optical circuits may comprise multiple photonic functions/devices and optical waveguides. The optical waveguides are configured to confine and guide light from a first point on an integrated chip (IC) to a second point on the IC with minimal attenuation. Many modern optical waveguides are formed using semiconductors. The semiconductor waveguides may guide light along an individual level of the IC.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 24 illustrates a flow diagram of some embodiments of a method for forming an optical module comprising a plurality of bypass waveguides overlying a plurality of waveguides.

DETAILED DESCRIPTION

Figure 1:
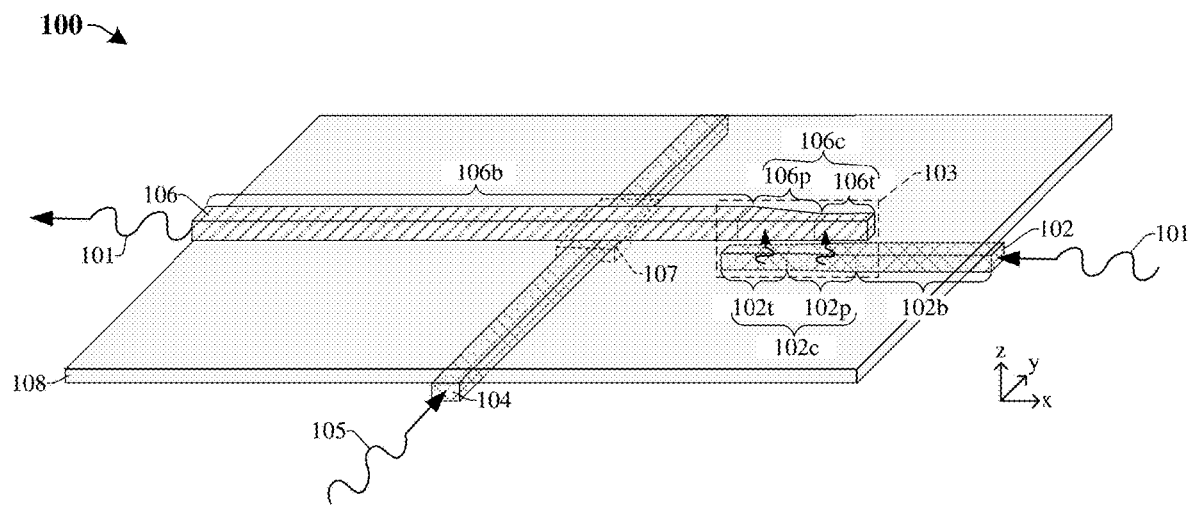
FIG. 1 illustrates a perspective view of some embodiments of an optical module comprising a bypass waveguide configured to facilitate inter-level optical interconnection.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated circuits (ICs) may include an optical module that has one or more waveguides configured to guide or transmit optical signals. At high frequencies and/or high data rates, optical signals may be communicated across longer distances with less power consumption and delay compared to electrical signals. Thus, the optical module may be utilized in the IC to facilitate signal transmission across the IC with less power and delay compared to electrical coupling. The one or more waveguides includes a first plurality of waveguides extending in parallel with one another along a first direction (e.g., along an x-axis) and a second plurality of waveguides extending in parallel with one another along a second direction (e.g., along a y-axis) orthogonal to the first direction. This facilitates carrying optical signals in different directions across the optical module, thereby increasing optical interconnection between optical components (e.g., optical transmitters and/or receivers, photodetectors, etc.).

The first and second plurality of waveguides may be formed by patterning a single semiconductor layer (e.g., a single crystalline silicon substrate) such that the first and second plurality of waveguides are coplanar and may intersect or cross one another at a plurality of waveguide intersection regions. This facilitates intra-level optical interconnect across long distances. However, because the first and second plurality of waveguides are coplanar they directly contact one another at the waveguide intersection regions. As a result, optical transmission losses (e.g., from reflection and/or scattering of optical signal(s)) may occur at the waveguide intersection regions due to a shape of the waveguides at the intersection regions and/or due optical interference between optical signals traveling through intersecting waveguides. In some instances, a layout and/or shape of the waveguides may be adjusted at the waveguide intersection regions to reduce the optical transmission losses (e.g., by reducing reflection and/or scattering) of the optical signals. Nevertheless, reduction of the optical transmission losses by adjusting a layout and/or shape of the waveguides at the waveguide intersection regions is limited and may not meet performance requirements. Therefore, the optical module has a relatively low optical transmission efficiency and decreased performance.

Various embodiments of the present disclosure are directed towards an optical module including a bypass waveguide configured to facilitate inter-level optical interconnection and increase an optical transmission efficiency of the optical module. The optical module includes a first waveguide laterally extending in a first direction (e.g., along an x-axis) and a transverse waveguide laterally extending in a second direction (e.g., along a y-axis) that is different from (e.g., orthogonal) the first direction. The transverse waveguide and the first waveguide are configured to carry optical signals in different directions from one another and are coplanar with one another. The first waveguide is laterally offset from the transverse waveguide and comprises a waveguide body segment adjacent to a waveguide coupler structure.

The bypass waveguide comprises a bypass body segment adjacent to a bypass coupler structure, where the bypass coupler structure is vertically spaced from and optically coupled to the first waveguide. Further, the bypass body segment directly overlies and is vertically separated from the transverse waveguide. Accordingly, an optical signal may travel across the first waveguide in the first direction and is transmitted in a third direction (e.g., along a z-axis) to the bypass waveguide such that the optical signal travels across the bypass body segment in the first direction. Thus, the bypass waveguide facilitates carrying the optical signal in a region above the transverse waveguide. As a result, the optical module may carry optical signals in different directions while mitigating optical transmission losses (e.g., reflection and/or scattering) between waveguides extending in different directions (e.g., between the first waveguide and the transverse waveguide). Therefore, an optical transmission efficiency and overall performance of the optical module is increased.

FIG. 1 illustrates a perspective view 100 of some embodiments of an optical module comprising a bypass waveguide 106 configured to facilitate inter-level optical interconnection.

The optical module includes a waveguide 102 continuously laterally extending in a first direction (e.g., along the x-axis) and a transverse waveguide 104 continuously laterally extending in a second direction (e.g., along the y-axis). The first direction is different from the second direction. For example, the first direction is orthogonal to the second direction. In some embodiments, the waveguide 102 is coplanar with the transverse waveguide 104. A first dielectric layer 108 continuously laterally extends along a top surface of the waveguide 102 and a top surface of the transverse waveguide 104. The bypass waveguide 106 continuously laterally extends in the first direction and overlies the first dielectric layer 108. The bypass waveguide 106 is vertically spaced from the waveguide 102 and the transverse waveguide 104 by a height of the first dielectric layer 108.

The waveguide 102 comprises a waveguide body segment 102b elongated in the first direction and a waveguide coupler structure 102c abutting the waveguide body segment 102b. The bypass waveguide 106 comprises a bypass body segment 106b elongated in the first direction and a bypass coupler structure 106c abutting the bypass body segment 106b. The bypass coupler structure 106c directly overlies the waveguide 102 in an inter-level coupling region 103. As a result, the waveguide 102 and the bypass waveguide 106 are optically coupled to one another in the inter-level coupling region 103 by way of at least one of the bypass coupler structure 106c and the waveguide coupler structure 102c. In some embodiments, the waveguide coupler structure 102c comprises a waveguide tapered segment 102p and a waveguide tip segment 102t, where a width of the waveguide tapered segment 102p decreases continuously from the waveguide body segment 102b to the waveguide tip segment 102t. In further embodiments, the bypass coupler structure 106c comprises a bypass tapered segment 106p and a bypass tip segment 106t, where a width of the bypass tapered segment 106p decreases continuously from the bypass body segment 106b to the bypass tip segment 106t.

In some embodiments, during operation of the optical module, a first optical signal 101 is received or guided along the waveguide 102 in the first direction (e.g., along the x-axis). The first optical signal 101 travels along the waveguide body segment 102b to the waveguide coupler structure 102c. By virtue of a layout, shape, and/or material of the waveguide and/or bypass coupler structures 102c, 106c, the waveguide 102 is configured to transmit or guide the first optical signal 101 from the waveguide coupler structure 102c to the bypass waveguide 106 along a third direction (e.g., along the z-axis) through the first dielectric layer 108. The bypass waveguide 106 is configured to transmit or guide the first optical signal 101 along the first direction (e.g., along the x-axis) at a different level than that of the waveguide 102 and/or the transverse waveguide 104. The transverse waveguide 104 is configured to transmit or guide a second optical signal 105 along the second direction (e.g., along the y-axis) at a same level as the waveguide 102.

Further, at least a portion of the bypass body segment 106b crosses or overlaps a width of the transverse waveguide 104 at a waveguide overlap region 107. The bypass waveguide 106 is vertically separated from the transverse waveguide 104 by the first dielectric layer 108 at the waveguide overlap region 107. Accordingly, the bypass waveguide 106 carries or transmits the first optical signal 101 along the first direction at a different level from that of the transverse waveguide 104, thereby mitigating optical transmission losses (e.g., reflection and/or scattering) between the transverse waveguide 104 and the bypass waveguide 106 at the waveguide overlap region 107. Thus, the bypass waveguide 106 facilitates inter-level optical interconnect. As a result, the optical module may carry optical signals in different directions while mitigating optical transmission loss (e.g., reflection and/or scattering) between waveguides extending in different directions (e.g., between the waveguide and/or bypass waveguide 102, 106 and the transverse waveguide 104). Therefore, an optical transmission efficiency and overall performance of the optical module is increased.

In various embodiments, it will be appreciated that while FIG. 1 illustrates the waveguide 102 transmitting or passing the first optical signal 101 to the bypass waveguide 106, the bypass waveguide 106 may transmit or pass an optical signal to the waveguide 102. Accordingly, the waveguide 102 and the bypass waveguide 106 are respectively configured to transmit or receive optical signals at the waveguide and bypass coupler structures 102c, 106c.

Figure 2A:
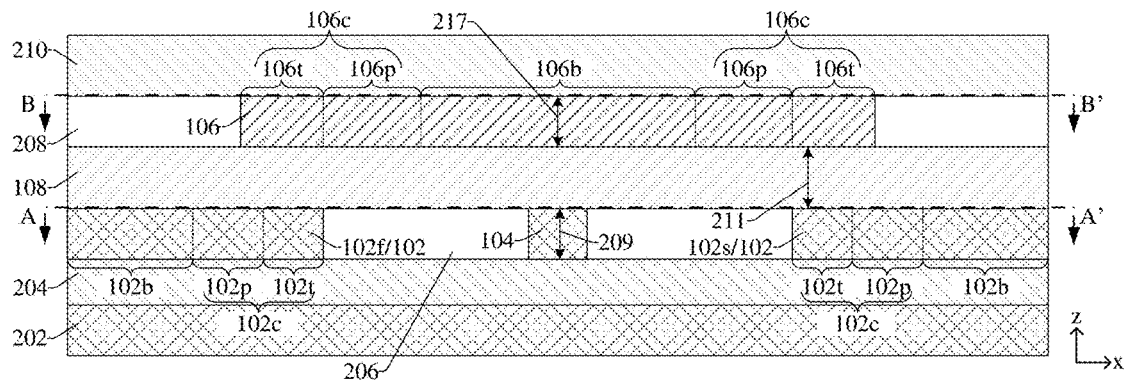
FIGS. 2A-2C illustrate various views of some embodiments of an optical module comprising a bypass waveguide overlying a plurality of waveguides.
Figure 2B:
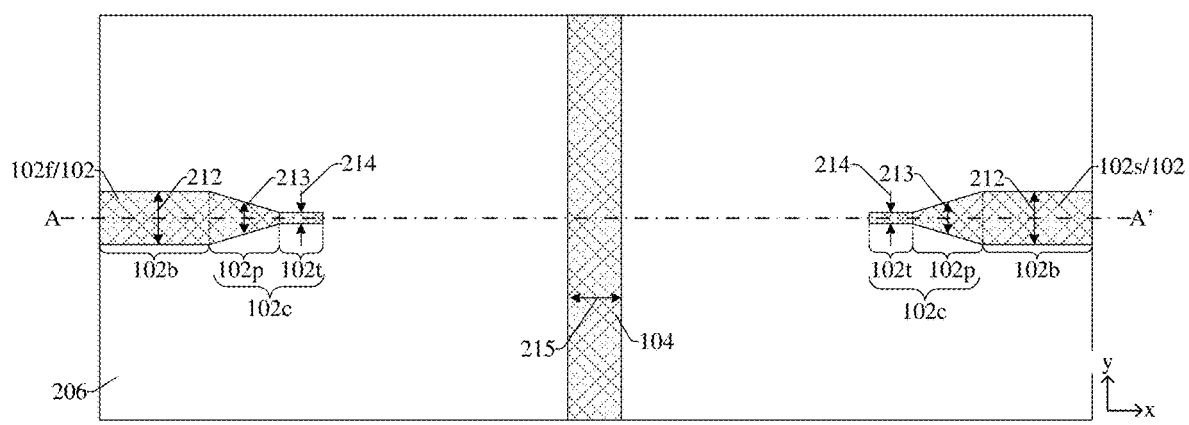
Figure 2C:
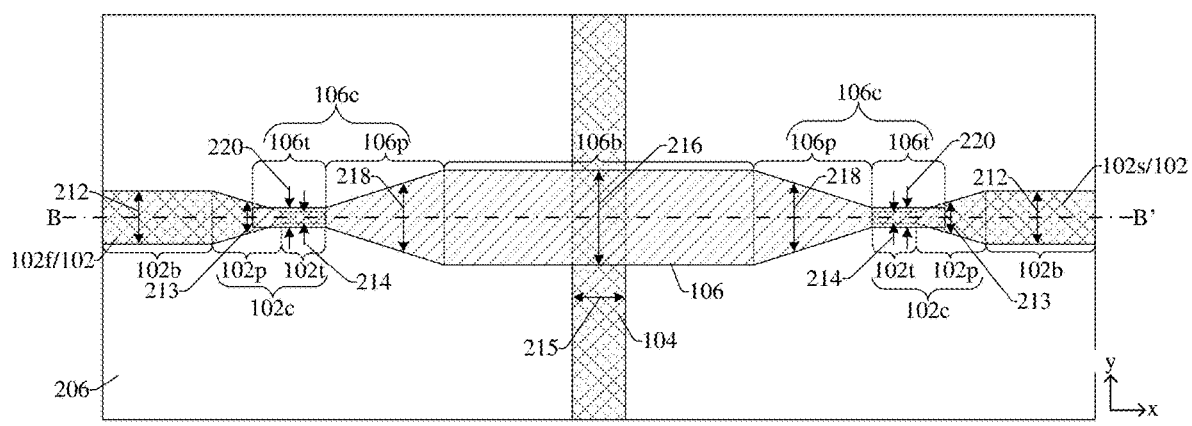

FIGS. 2A-2C illustrate various views of some embodiments of an optical module comprising a bypass waveguide 106 overlying a plurality of waveguides 102. FIG. 2A illustrates a cross-sectional view 200a of some embodiments of the optical module. FIG. 2B illustrates a top view 200b of some embodiments of the optical module taken along line A-A' of FIG. 2A. FIG. 2C illustrates a top view 200c of some embodiments of the optical module taken along line B-B' of FIG. 2A, where various structures (e.g., first dielectric layer 108 and/or second cladding layer 208) are omitted from the top view 200c.

In some embodiments, the optical module comprises the plurality of waveguides 102 and a transverse waveguide 104 overlying a substrate 202. The plurality of waveguides 102 and the transverse waveguide 104 are coplanar. The plurality of waveguides 102 comprises a first waveguide 102f and a second waveguide 102s. An insulator layer 204 is arranged between the substrate 202 and the plurality of waveguides 102. The substrate 202 may, for example, be or comprise a semiconductor body such as silicon, monocrystalline silicon, polycrystalline silicon, bulk silicon, or another suitable semiconductor substrate material. A first cladding layer 206 overlies the insulator layer 204 and laterally warps around the plurality of waveguides 102 and the transverse waveguide 104. A first dielectric layer 108 overlies the first cladding layer 206. The bypass waveguide 106 overlies the first dielectric layer 108. The first dielectric layer 108 vertically spaces the bypass waveguide 106 from the plurality of waveguides 102 and the transverse waveguide 104. A second cladding layer 208 overlies the first dielectric layer 108 and laterally warps around the bypass waveguide 106. Further, a second dielectric layer 210 overlies the first dielectric layer 108 and the bypass waveguide 106.

The plurality of waveguides 102 and the transverse waveguide 104 comprise a first material (e.g., silicon, monocrystalline silicon) having a first refractive index. The bypass waveguide 106 comprises a second material (e.g., silicon nitride, polysilicon, amorphous silicon, a polymer, etc.) having a second refractive index. The first cladding layer 206 has a third refractive index different from the first refractive index. In some embodiments, by virtue of at least the difference between the first refractive index and the third refractive index, optical signals (e.g., light) are confined along the plurality of waveguides 102 and the transverse waveguide 104. Further, the second cladding layer 208 has a fourth refractive index different from the second refractive index. In some embodiments, by virtue of at least the difference between the second refractive index and the third refractive index, optical signals (e.g., light) are confined along the bypass waveguide 106. In various embodiments, the third refractive index is less than the first refractive index and the fourth refractive index is less than the second refractive index. In yet further embodiments, the second refractive index is less than the first refractive index.

The waveguides 102 respectively comprise a waveguide body segment 102b elongated in a first direction (e.g., along the x-axis) and a waveguide coupler structure 102c abutting the waveguide body segment 102b. The waveguide coupler structure 102c comprises a waveguide tapered segment 102p and a waveguide tip segment 102t, where a width 213 of the waveguide tapered segment 102p decreases continuously from the waveguide body segment 102b to the waveguide tip segment 102t (e.g., as shown in FIGS. 2B and 2C). The transverse waveguide 104 is configured to carry optical signals along a second direction (e.g., along the y-axis) opposite the first direction (e.g., see FIGS. 2B and 2C). The waveguides 102 are spaced on opposing sides of the transverse waveguide 104 and are laterally offset from the transverse waveguide 104 by non-zero distances. This facilitates optical isolation between the waveguides 102 and the transverse waveguide 104.

In some embodiments, the bypass waveguide 106 comprises a bypass body segment 106b elongated in the first direction (e.g., along the x-axis) and disposed between bypass coupler structures 106c. At least a portion of the bypass body segment 106b crosses or overhangs the transverse waveguide 104. The bypass coupler structures 106c respectively comprise a bypass tapered segment 106p abutting a bypass tip segment 106t, where a width 218 of the bypass tapered segment 106p decreases continuously from the bypass body segment 106b to the bypass tip segment 106t (e.g., as shown in FIG. 2C). The bypass coupler structures 106c directly overlie and are optically coupled to a corresponding waveguide in the plurality of waveguides 102. For example, during operation of the optical module an optical signal (e.g., light) may be carried across the first waveguide 102f along the first direction (e.g., along the x-axis) and is transmitted vertically (e.g., along the z-axis) to the bypass waveguide 106. The bypass waveguide 106 is configured to carry the optical signal along the first direction and transmit the optical signal vertically (e.g., along the z-axis) to the second waveguide 102s. By virtue of the bypass waveguide 106 being vertically offset from the transverse waveguide 104, the bypass waveguide 106 is optically isolated from the transverse waveguide 104. This decreases optical transmission losses between the bypass waveguide 106 and the transverse waveguide 104, such that an optical transmission efficiency of the optical signal across the first and second waveguides 102f, 102s is increased. Accordingly, the bypass waveguide 106 facilitates inter-level optical transmission across the optical module and facilitates the optical module carrying optical signals in different directions with decreased optical transmission losses. Thus, an optical transmission efficiency and overall performance of the optical module is increased.

In some embodiments, a height 211 of the first dielectric layer 108 is sufficiently large (e.g., greater than about 300 nm) relative to sizes (e.g., heights and/or widths) of the bypass waveguide 106 and the transverse waveguide 104. This, in part, facilitates optical isolation between the bypass waveguide 106 and the transverse waveguide 104, thereby mitigating or preventing optical coupling between the bypass waveguide 106 and the transverse waveguide 104. As a result, an optical transmission efficiency of the optical module is further increased. In various embodiments, a height 209 of the transverse waveguide 104 is less than a height 217 of the bypass waveguide 106, and the height 211 of the first dielectric layer 108 is greater than the height 217 of the bypass waveguide 106. For example, the height 209 of the transverse waveguide 104 may be about 270 nm, the height 217 of the bypass waveguide 106 may be about 300 nm, and the height 211 of the first dielectric layer 108 may be greater than about 300 nm. It will be appreciated that other values for the heights 209, 211, 217 are also within the scope of the disclosure. In various embodiments, the bypass tip segment 106t directly overlies a corresponding waveguide tip segment 102*t* of the waveguides 102, thereby increasing optical coupling efficiency between the bypass waveguide 106 and the waveguides 102. In some embodiments, a length of the bypass tip segment 106*t* is greater than a length of the waveguide tip segment 102*t*. In yet further embodiments, the length of the bypass tip segment 106*t* is equal to the length of the waveguide tip segment 102*t*.

As illustrated in the top views 200*b* and 200*c* of FIGS. 2B and 2C, in some embodiments, a size (e.g., height and/or width) of the bypass waveguide 106 is greater than sizes (e.g., heights and/or widths) of the waveguides 102. Thus, in some embodiments, a mode size (e.g., the size of the electric field distribution) of the bypass waveguide 106 is greater than a mode size in the waveguides 102. In some embodiments, the waveguide coupler structure 102*c* of each of the waveguides 102 is configured as a spot-size converter (SSC) for expanding the mode size along the waveguides 102 to match the mode size of the bypass waveguide 106. Further, the bypass coupler structures 106*c* may each be configured as an SSC to match the mode sizes of the waveguides 102. The SSC of the waveguide and bypass coupler structures 102*c*, 106*c* are formed at least in part by the tapered widths 213, 218 of the waveguide and bypass tapered segments 102*p*. 106*p* and the decreased widths 214, 220 of the waveguide and bypass tip segments 102*t*, 106*t*. As a result, mode sizes at the waveguide and bypass tip segments 102*t*, 106*t* may respectively match mode sizes at the bypass waveguide 106 and the waveguides 102. This facilitates good optical coupling between the bypass waveguide 106 and the waveguides 102, thereby increasing the optical transmission efficiency and overall performance of the optical module.

In various embodiments, a width 212 of the waveguide body segment 102*b* is less than a width 216 of the bypass body segment 106*b*. In some embodiments, the width 212 of the waveguide body segment 102*b* is about 370 nm, within a range of about 350 nm to about 390 nm, or some other suitable value. In further embodiments, the width 216 of the bypass body segment 106*b* is about 1 micrometer (um), within a range of about 0.9 um to about 1.1 um, or some other suitable value. In some embodiments, a width 215 of the transverse waveguide 104 is equal to the width 212 of the waveguide body segment 102*b*. A width 214 of the waveguide tip segment 102*t* is less than a width 220 of the bypass tip segment 106*t*. Further, at least a portion of the bypass tip segment 106*t* directly overlies a portion of the waveguide tapered segment 102*p* and/or a portion of the waveguide body segment 102*b*. In some embodiments, at least a portion of the bypass tapered segment 106*p* directly overlies at least a portion of the waveguide tip segment 102*t*.

The insulator layer 204 may, for example, be or comprise an oxide, such as silicon dioxide, a low-k dielectric material, some other suitable dielectric material, or any combination of the foregoing. The first cladding layer 206 and/or the second cladding layer 208 may, for example, be or comprise silicon dioxide, a metal oxide (e.g., hafnium oxide), some other suitable material, or any combination of the foregoing. The first dielectric layer 108 and/or the second dielectric layer 210 may, for example, be or comprise silicon dioxide, a metal oxide (e.g., hafnium oxide), another oxide, some other suitable material, or any combination of the foregoing. The waveguides 102 and the transverse waveguide 104 comprise a first material. The first material may, for example, be or comprise silicon, monocrystalline silicon, some other suitable material, or the like. In some embodiments, the bypass waveguide 106 comprises a second material different from the first material. The second material may, for example, be or comprise silicon nitride, polysilicon, amorphous silicon, a polymer, or the like. In yet further embodiments, refractive indices of the insulator layer 204, the first dielectric layer 108, and the second dielectric layer are less than the first refractive index and/or the second refractive index.

Figure 3:
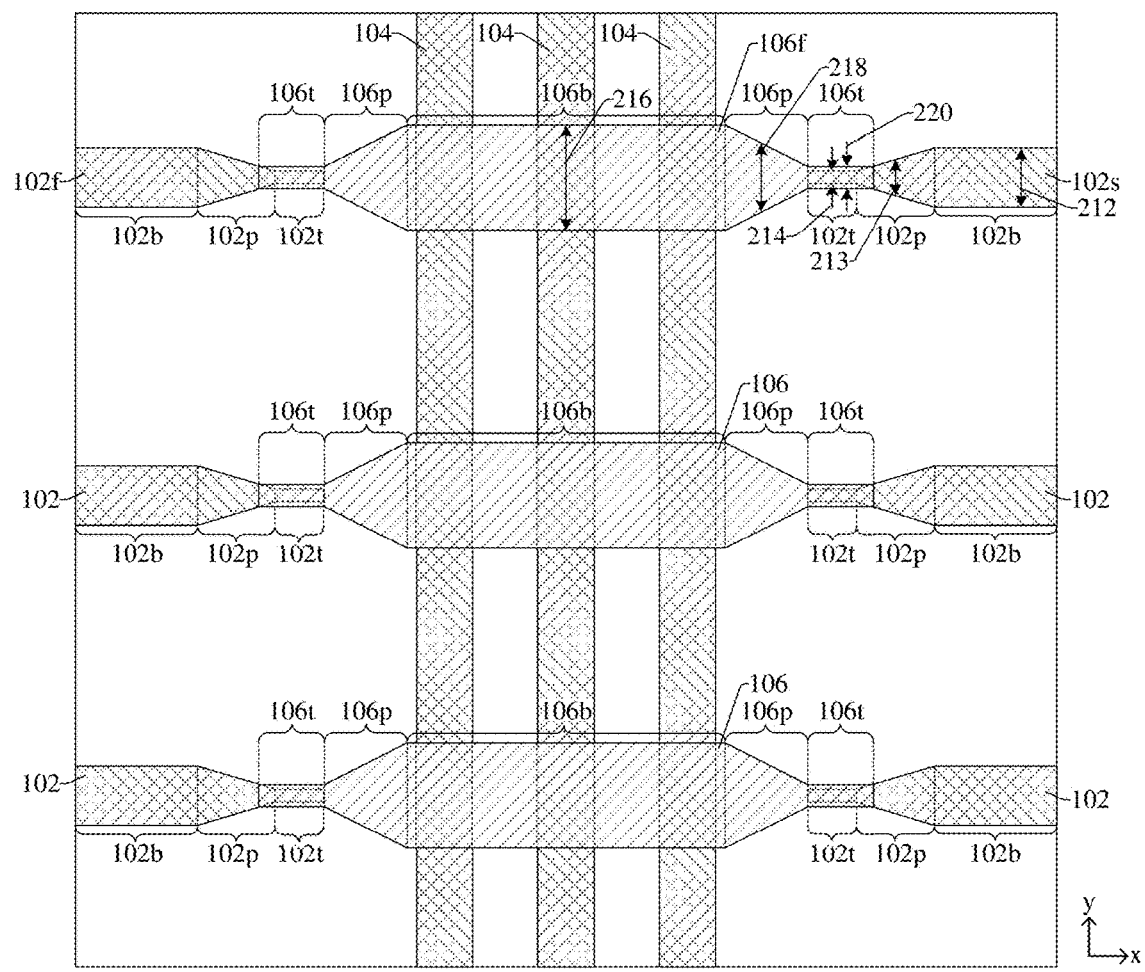
FIG. 3 illustrates a top view of some embodiments of an optical module comprising a plurality of bypass waveguides overlying a plurality of waveguides.

FIG. 3 illustrates a top view 300 of some embodiments of an optical module comprising a plurality of bypass waveguides 106 overlying a plurality of waveguides 102. The plurality of bypass waveguides 106 are vertically offset from the plurality of waveguides 102 by a non-zero vertical distance.

As illustrated in the top view 300 of FIG. 3, a pair of waveguides in the plurality of waveguides 102 is disposed on opposing sides of an individual bypass waveguide in the plurality of bypass waveguides 106. The plurality of waveguides 102 and the plurality of bypass waveguides 106 respectively laterally extend along a first direction (e.g., along the x-axis). A plurality of transverse waveguides 104 continuously laterally extend along a second direction (e.g., along the y-axis) different from the first direction. Each bypass waveguide in the plurality of bypass waveguides 106 is configured to facilitate optical coupling between a corresponding pair of waveguides in the plurality of waveguides 102. For example, the plurality of waveguides 102 comprises a first waveguide 102*f* and a second waveguide 102*s* and the plurality of bypass waveguides 106 comprises a first bypass waveguide 106*f*. The first bypass waveguide 106*f* is configured to optically couple the first waveguide 102*f* to the second waveguide 102*s*. The plurality of bypass waveguides 106 are vertically offset from the plurality of transverse waveguides 104 by the non-zero vertical distance. As a result, one or more optical signals may be transmitted or carried between corresponding pairs of waveguides in the plurality of waveguides 102 along the first direction while mitigating optical transmission loss(es). Thus, the plurality of bypass waveguides 106 facilitate inter-level optical interconnection in the optical module and minimizes optical transmission loss(es) (e.g., due to scattering and/or reflection) at overlapping regions between the bypass waveguides 106 and the transverse waveguides 104. Thus, an optical transmission efficiency and overall performance of the optical module is increased.

Figure 4A:
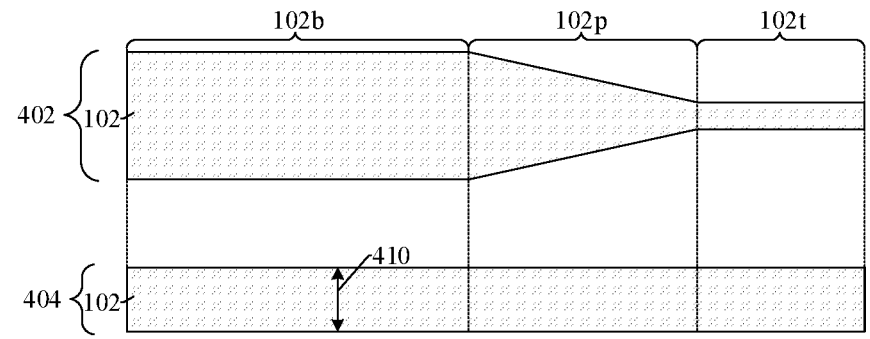
FIGS. 4A-4C illustrate various views of some embodiments of a waveguide having a waveguide body segment, a waveguide tapered segment, and a waveguide tip segment.
Figure 4B:
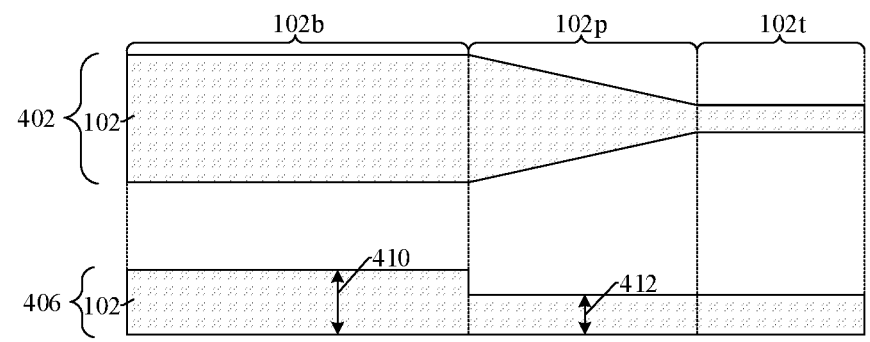
Figure 4C:
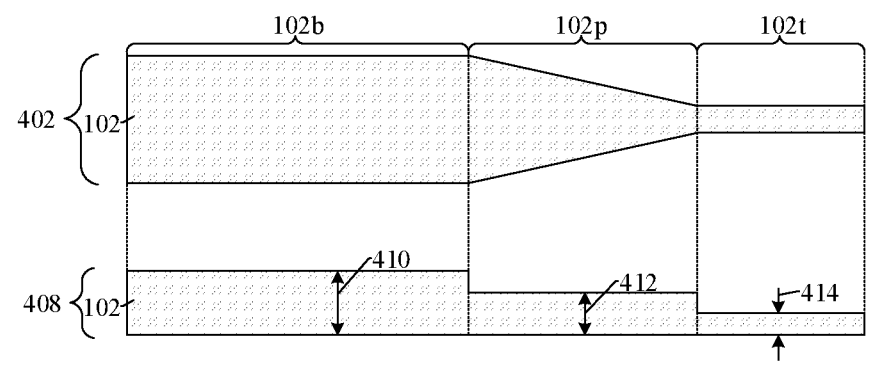

FIGS. 4A-4C illustrate various views of some embodiments of a waveguide 102. The waveguide 102 of FIGS. 4A-4C may correspond to some embodiments of the waveguides 102 of FIGS. 1-3.

FIG. 4A illustrates a top view 402 and a cross-sectional view 404 of some embodiments of the waveguide 102, in which the waveguide 102 has a first height 410 across a length of the waveguide 102. For example, the waveguide body segment 102*b*, the waveguide tapered segment 102*p*, and the waveguide tip segment 102*t* each have the first height 410. In some embodiments, the first height 410 is about 270 nm, within a range of about 280 nm to about 290 nm, or some other suitable value.

FIG. 4B illustrates the top view 402 and a cross-sectional view 406 of some other embodiments of the waveguide 102, in which the waveguide 102 has different heights across different segments of the waveguide 102. In some embodiments, the waveguide 102 having the different heights further increases an ability for the waveguide 102 to match a mode size of another waveguide (e.g., the bypass waveguide 106 of FIGS. 1-3), thereby increasing optical coupling. In some embodiments, the waveguide body segment 102*b* has the first height 410, and the waveguide tapered segment 102p and the waveguide tip segment 102t have a second height 412 less than the first height 410.

FIG. 4C illustrates the top view 402 and a cross-sectional view 408 of some other embodiments of the waveguide 102, in which the waveguide 102 has different heights across different segments of the waveguide 102. The waveguide body segment 102b has the first height 410, the waveguide tapered segment 102p has the second height 412, and the waveguide tip segment 102t has a third height 414. In some embodiments, the second height 412 is less than the first height 410 and the third height 414 is less than the second height 412.

Figure 5A:
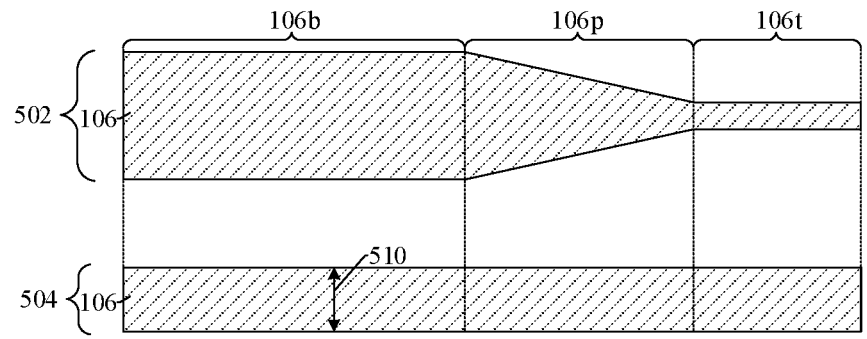
FIGS. 5A-5C illustrate various views of some embodiments of a bypass waveguide having a bypass body segment, a bypass tapered segment, and a bypass tip segment.
Figure 5B:
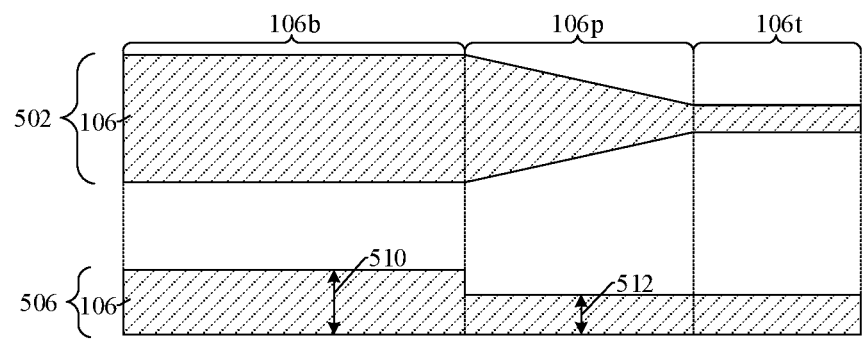
Figure 5C:
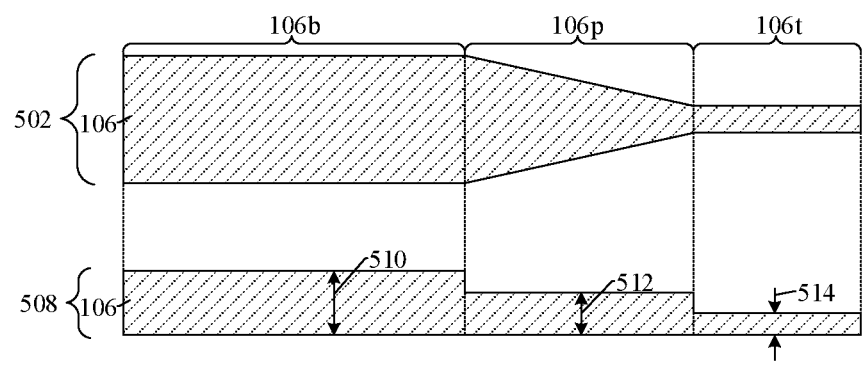

FIGS. 5A-5C illustrate various views of some embodiments of a bypass waveguide 106. The bypass waveguide 106 of FIGS. 5A-5C may correspond to some other embodiments of the bypass waveguides 106 of FIGS. 1-3.

FIG. 5A illustrates a top view 502 and a cross-sectional view 504 of some embodiments of the bypass waveguide 106, in which the bypass waveguide 106 has a first height 510 across a length of the bypass waveguide 106. For example, the bypass body segment 106b, the bypass tapered segment 106p, and the bypass tip segment 106t each have the first height 510. In some embodiments, the first height 510 is about 300 nm, within a range of about 290 nm to about 310 nm, or some other suitable value.

FIG. 5B illustrates the top view 502 and a cross-sectional view 506 of some other embodiments of the bypass waveguide 106, in which the bypass waveguide 106 has different heights across different segments of the bypass waveguide 106. In some embodiments, the bypass waveguide 106 having the different heights further increases an ability for the bypass waveguide 106 to match a mode size of another waveguide (e.g., the waveguide 102 of FIGS. 1-3), thereby increasing optical coupling. In some embodiments, the bypass body segment 106b has the first height 510, and the bypass tapered segment 106p and the bypass tip segment 106t have a second height 512 less than the first height 510.

FIG. 5C illustrates the top view 502 and a cross-sectional view 508 of some other embodiments of the bypass waveguide 106, in which the bypass waveguide 106 has different heights across different segments of the bypass waveguide 106. The bypass body segment 106b has the first height 510, the bypass tapered segment 106p has the second height 512, and the bypass tip segment 106t has a third height 514. In some embodiments, the second height 512 is less than the first height 510 and the third height 514 is less than the second height 512.

Figure 6A:
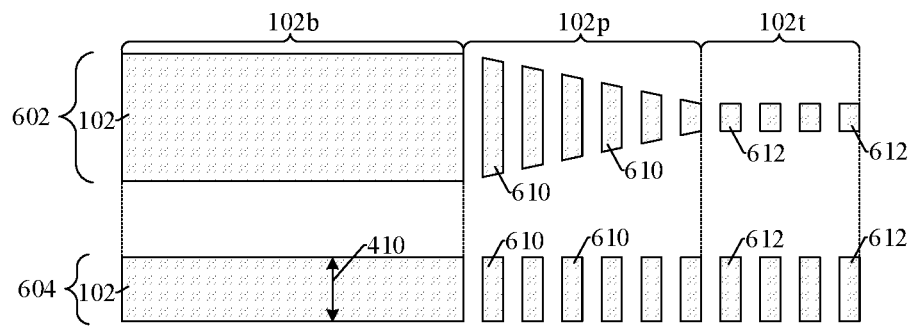
FIGS. 6A-6C illustrate various views of some embodiments of the waveguide of FIGS. 4A-4C in which the waveguide tapered segment and the waveguide tip segment respectively comprise grating elements.
Figure 6B:
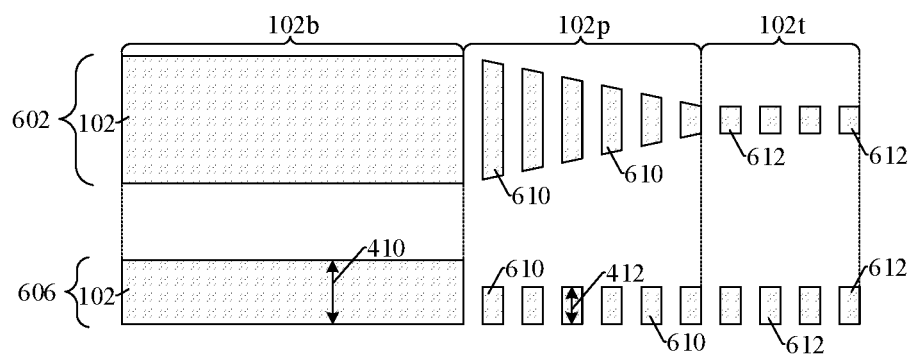
Figure 6C:
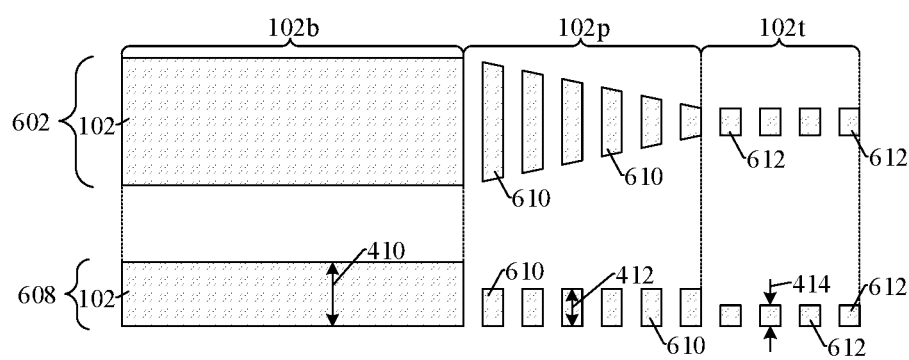

FIGS. 6A-6C illustrate various views of some other embodiments of a waveguide 102, in which the waveguide tapered segment 102p comprises a plurality of tapered grating elements 610 laterally spaced from one another and the waveguide tip segment 102t comprises a plurality of tip grating elements 612 laterally spaced from one another. In various embodiments, a spacing between adjacent tapered grating elements 610 and adjacent tip grating elements 612 is equal. In some embodiments, the waveguide 102 having the grating elements further increases optical coupling with another waveguide (e.g., the bypass waveguide 106 of FIGS. 1-3). The waveguide 102 of FIGS. 6A-6C may correspond to some embodiments of the waveguides 102 of FIGS. 1-3.

FIG. 6A illustrates a top view 602 and a cross-sectional view 604 of some embodiments of the waveguide 102, in which the waveguide 102 has the first height 410 across a length of the waveguide 102.

FIG. 6B illustrates the top view 602 and a cross-sectional view 606 of some other embodiments of the waveguide 102, in which the waveguide body segment 102b has the first height 410, and the plurality of tapered grating elements 610 and the plurality of tip grating elements 612 have the second height 412.

FIG. 6C illustrates the top view 602 and a cross-sectional view 608 of some other embodiments of the waveguide 102, in which the waveguide body segment 102b has the first height 410, the plurality of tapered grating elements 610 have the second height 412, and the plurality of tip grating elements 612 have the third height 414.

Figure 7A:
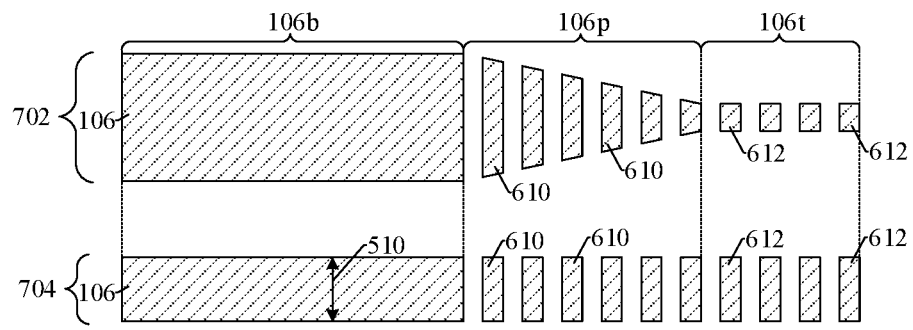
FIGS. 7A-7C illustrate various views of some embodiments of the bypass waveguide of FIGS. 5A-5C in which the bypass tapered segment and the bypass tip segment respectively comprising grating elements.
Figure 7B:
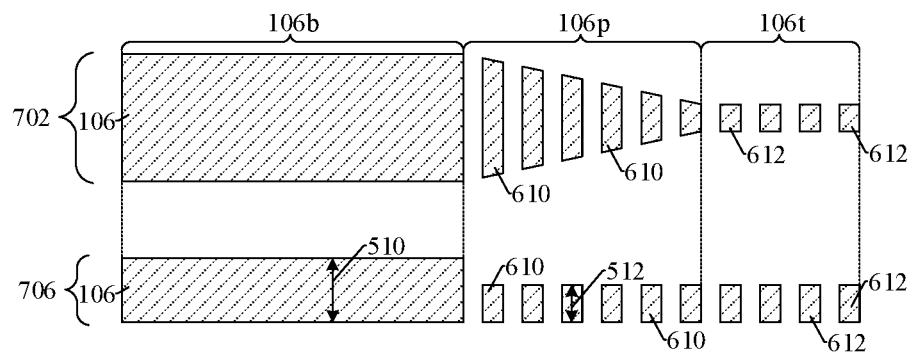
Figure 7C:
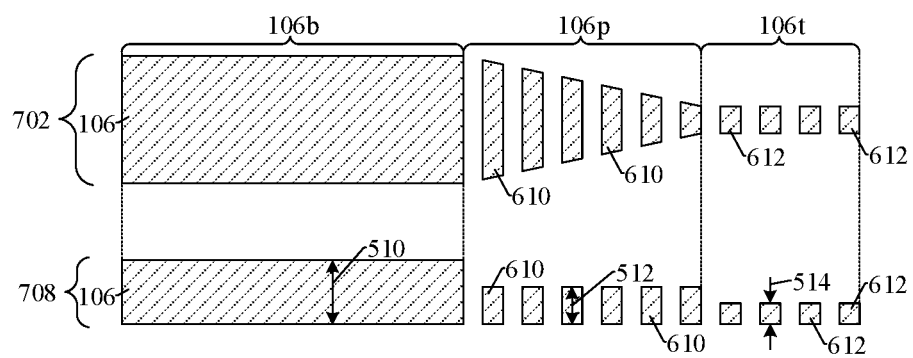

FIGS. 7A-7C illustrate various views of some other embodiments of a bypass waveguide 106, in which the bypass tapered segment 106p comprises a plurality of tapered grating elements 610 laterally spaced from one another and the bypass tip segment 106t comprises a plurality of tip grating elements 612 laterally spaced from one another. In various embodiments, a spacing between adjacent tapered grating elements 610 and adjacent tip grating elements 612 is equal. The bypass waveguide 106 of FIGS. 7A-7C may correspond to some embodiments of the bypass waveguides 106 of FIGS. 1-3.

FIG. 7A illustrates a top view 702 and a cross-sectional view 704 of some embodiments of the bypass waveguide 106, in which the bypass waveguide 106 has the first height 510 across a length of the bypass waveguide 106.

FIG. 7B illustrates the top view 702 and a cross-sectional view 706 of some other embodiments of the bypass waveguide 106, in which the bypass body segment 106b has the first height 510, and the plurality of tapered grating elements 610 and the plurality of tip grating elements 612 have the second height 512.

FIG. 7C illustrates the top view 702 and a cross-sectional view 708 of some other embodiments of the bypass waveguide 106, in which the bypass body segment 106b has the first height 510, the plurality of tapered grating elements 610 have the second height 512, and the plurality of tip grating elements 612 have the third height 514.

Figure 8A:
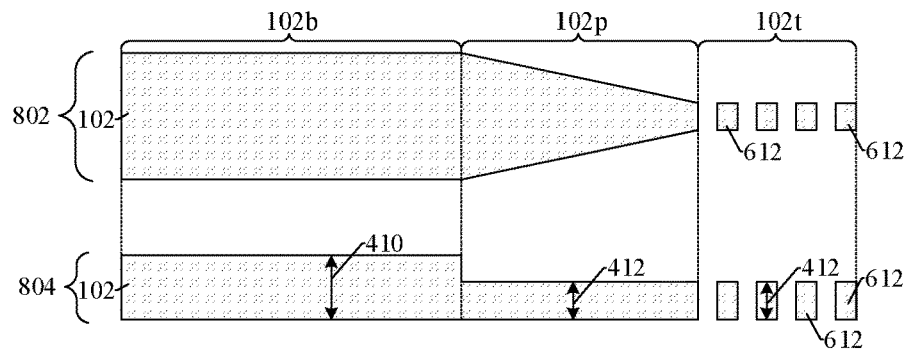
FIGS. 8A and 8B illustrate various views of some other embodiments of the waveguide of FIGS. 6B and 6C.
Figure 8B:
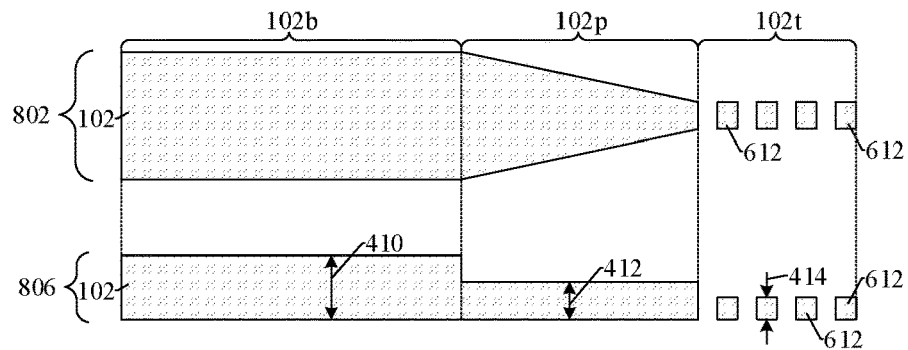

FIGS. 8A and 8B illustrate various views of some other embodiments of a waveguide 102 corresponding to some other embodiments of the waveguide 102 of FIGS. 6B and 6C, in which the waveguide tapered segment 102p is a single continuous structure directly contacting the waveguide body segment 102b.

FIG. 8A illustrates a top view 802 and a cross-sectional view 804 of some embodiments of the waveguide 102, in which the waveguide body segment 102b has the first height 410, and the waveguide tapered segment 102p and the plurality of tip grating elements 612 have the second height 412.

FIG. 8B illustrates the top view 802 and a cross-sectional view 806 of some other embodiments of the waveguide 102, in which the waveguide body segment 102b has the first height 410, the waveguide tapered segment 102p has the second height 412, and the plurality of tip grating elements 612 have the third height 414.

Figure 9A:
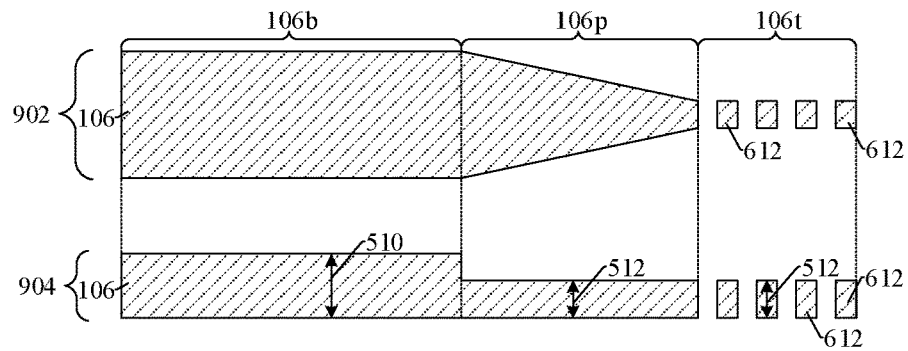
FIGS. 9A and 9B illustrate various views of some other embodiments of the bypass waveguide of FIGS. 7B and 7C.
Figure 9B:
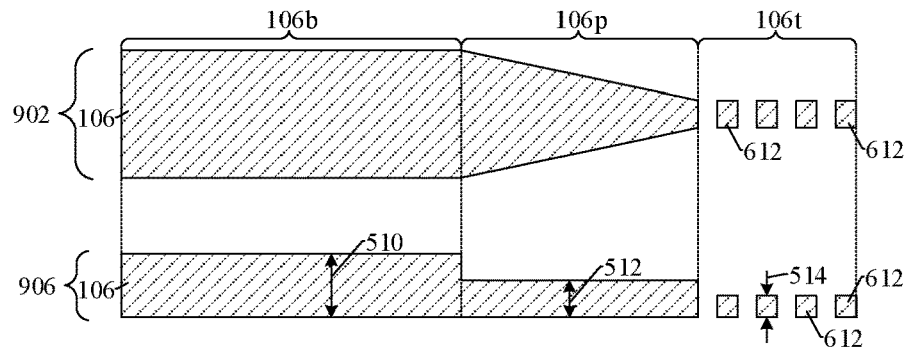

FIGS. 9A and 9B illustrate various views of some other embodiments of a bypass waveguide 106 corresponding to some other embodiments of the bypass waveguide 106 of FIGS. 7B and 7C, in which the bypass tapered segment 106p is a single continuous structure directly contacting the bypass body segment 106b.

FIG. 9A illustrates a top view 902 and a cross-sectional view 904 of some embodiments of the bypass waveguide 106, in which the bypass body segment 106b has the first height 510, and the bypass tapered segment 106p and the plurality of tip grating elements 612 have the second height 512.

FIG. 9B illustrates the top view 902 and a cross-sectional view 906 of some other embodiments of the bypass waveguide 106, in which the bypass body segment 106b has the first height 510, the bypass tapered segment 106p has the second height 512, and the plurality of tip grating elements 612 have the third height 514.

Figure 10A:
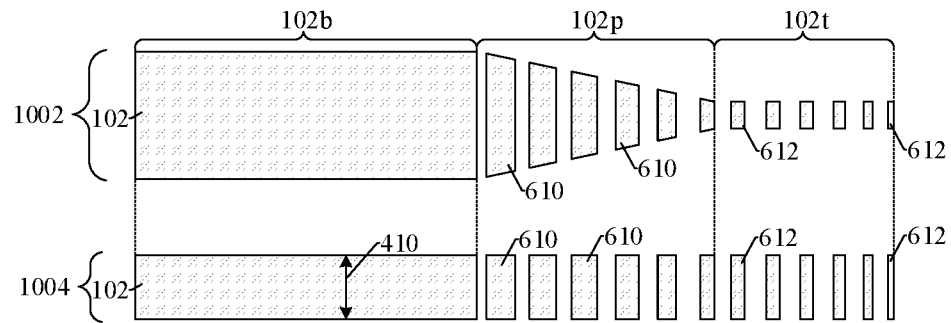
FIGS. 10A-10C illustrate various views of some other embodiments of the waveguide of FIGS. 6A-6C in which lengths of the grating elements are different from one another.
Figure 10B:
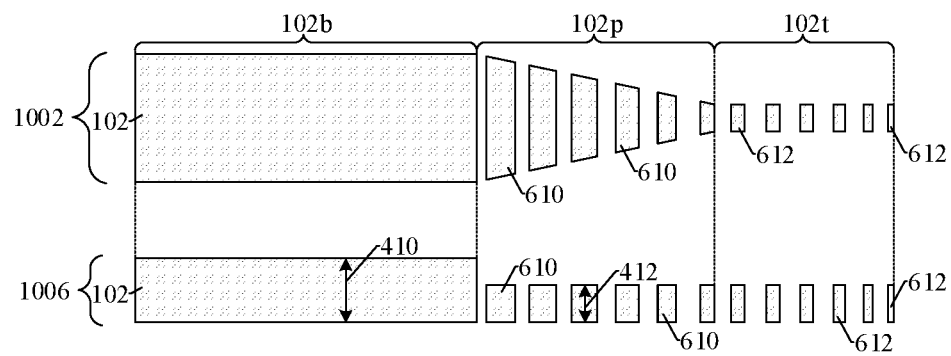
Figure 10C:
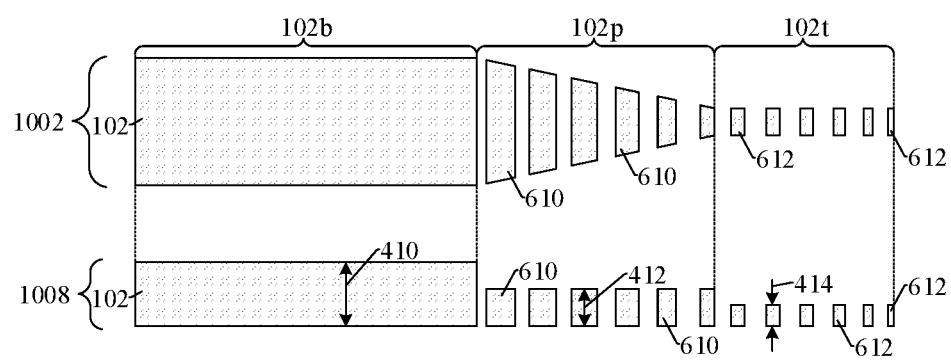

FIGS. 10A-10C illustrate various views of some other embodiments of a waveguide 102 corresponding to some other embodiments of the waveguide 102 of FIGS. 6A-6C, in which lengths of the tapered grating elements 610 are different from one another and lengths of the tip grating elements 612 are different from one another. In some embodiments, the length of each tapered grating element 610 is less than the length of an adjacent tapered grating element in a direction away from the waveguide body segment 102b. Further, the length of each tip grating element 612 is less than the length of an adjacent tip grating element in a direction away from the waveguide tapered segment 102p. In some embodiments, the waveguide 102 having the grating elements with different lengths mitigates undesirable refraction, thereby further increasing optical coupling with another waveguide (e.g., the bypass waveguide 106 of FIGS. 1-3).

FIG. 10A illustrates a top view 1002 and a cross-sectional view 1004 of some embodiments of the waveguide 102, in which the waveguide 102 has the first height 410 across a length of the waveguide 102. FIG. 10B illustrates the top view 1002 and a cross-sectional view 1006 of some other embodiments of the waveguide 102, in which the waveguide 102 has at least two different heights across different segments of the waveguide 102. FIG. 10C illustrates the top view 1002 and a cross-sectional view 1008 of some alternative embodiments of the waveguide 102, in which the waveguide 102 has at least three different heights across different segments of the waveguide 102.

Figure 11A:
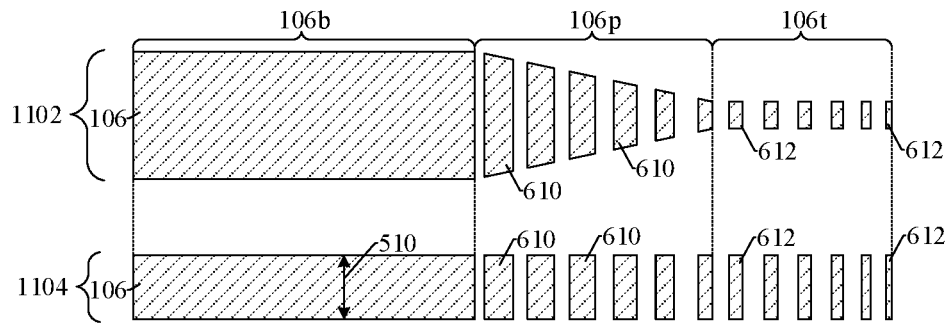
FIGS. 11A-11C illustrate various views of some other embodiments of the bypass waveguide of FIGS. 7A-7C in which lengths of the grating elements are different from one another.
Figure 11B:
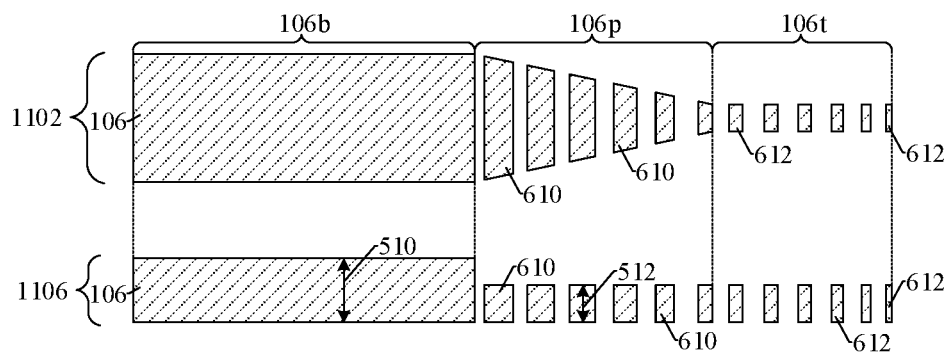
Figure 11C:
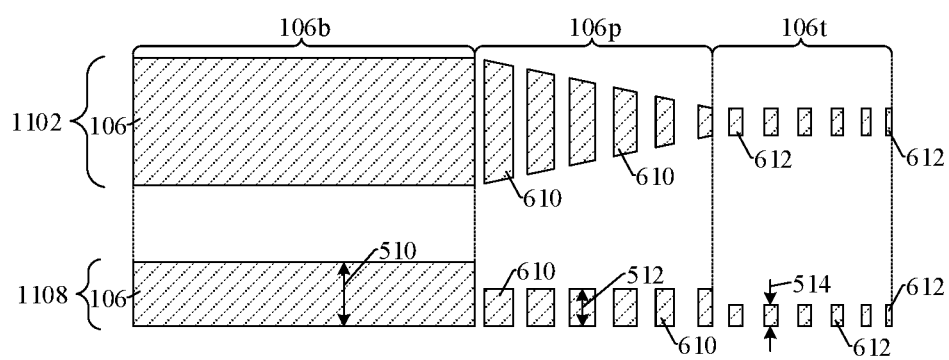

FIGS. 11A-11C illustrate various views of some other embodiments of a bypass waveguide 106 corresponding to some other embodiments of the bypass waveguide 106 of FIGS. 7A-7C, in which lengths of the tapered grating elements 610 are different from one another and lengths of the tip grating elements 612 are different from one another. In some embodiments, the length of each tapered grating element 610 is less than the length of an adjacent tapered grating element in a direction away from the bypass body segment 106b. Further, the length of each tip grating element 612 is less than the length of an adjacent tip grating element in a direction away from the bypass tapered segment 106p.

FIG. 11A illustrates a top view 1102 and a cross-sectional view 1104 of some embodiments of the bypass waveguide 106, in which the bypass waveguide 106 has the first height 510 across a length of the bypass waveguide 106. FIG. 11B illustrates the top view 1102 and a cross-sectional view 1106 of some other embodiments of the bypass waveguide 106, in which the bypass waveguide 106 has at least two different heights across different segments of the bypass waveguide 106. FIG. 11C illustrates the top view 1102 and a cross-sectional view 1108 of some alternative embodiments of the bypass waveguide 106, in which the bypass waveguide 106 has at least three different heights across different segments of the bypass waveguide 106.

Figure 12A:
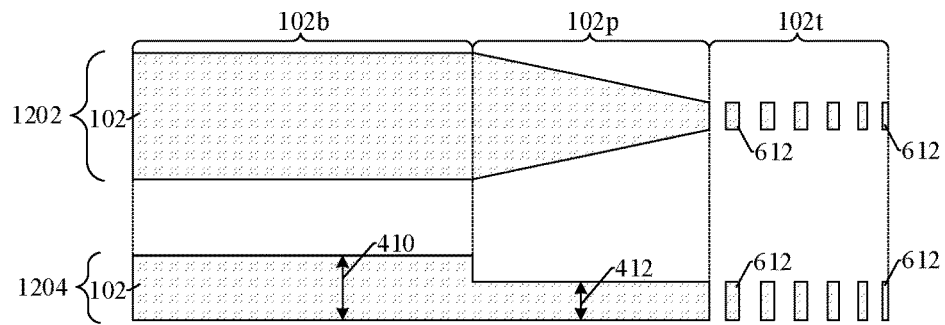
FIGS. 12A and 12B illustrate various views of other embodiments of the waveguide of FIGS. 10B and 10C.
Figure 12B:
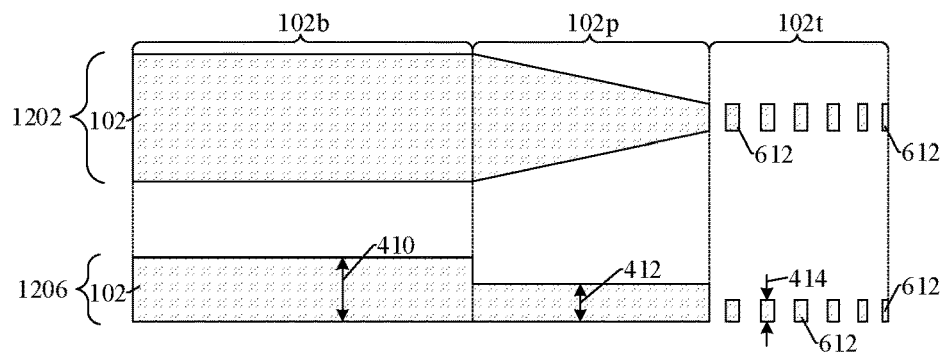

FIGS. 12A and 12B illustrate various views of some other embodiments of a waveguide 102 corresponding to some other embodiments of the waveguide 102 of FIGS. 10B and 10C, in which the waveguide tapered segment 102p is a single continuous structure directly contacting the waveguide body segment 102b.

FIG. 12A illustrates a top view 1202 and a cross-sectional view 1204 of some other embodiments of the waveguide 102, in which the waveguide 102 has at least two different heights across different segments of the waveguide 102. FIG. 12B illustrates the top view 1202 and a cross-sectional view 1206 of some alternative embodiments of the waveguide 102, in which the waveguide 102 has at least three different heights across different segments of the waveguide 102.

Figure 13A:
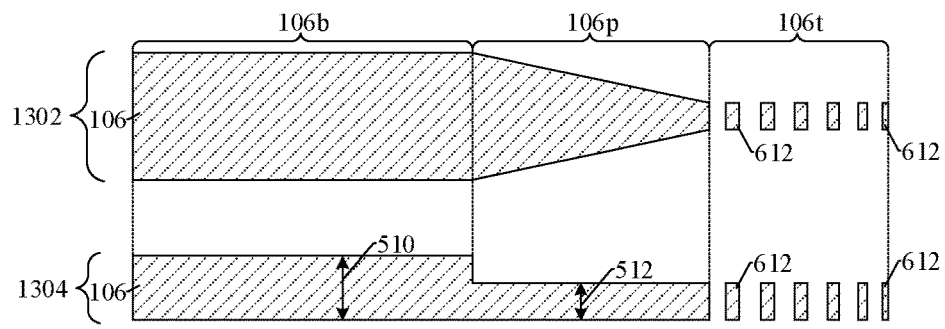
FIGS. 13A and 13B illustrate various views of other embodiments of the bypass waveguide of FIGS. 11B and 11C.
Figure 13B:
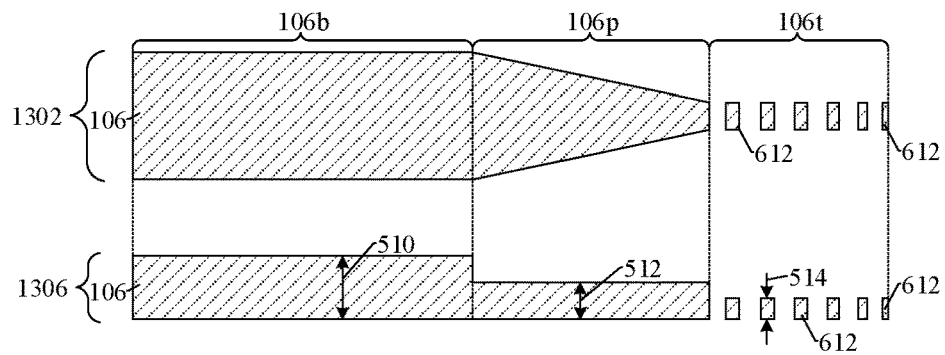

FIGS. 13A and 13B illustrate various views of some other embodiments of a bypass waveguide 106 corresponding to some other embodiments of the bypass waveguide 106 of FIGS. 11B and 11C, in which the bypass tapered segment 106p is a single continuous structure directly contacting the bypass body segment 106b.

FIG. 13A illustrates a top view 1302 and a cross-sectional view 1304 of some other embodiments of the bypass waveguide 106, in which the bypass waveguide 106 has at least two different heights across different segments of the bypass waveguide 106. FIG. 13B illustrates the top view 1302 and a cross-sectional view 1306 of some alternative embodiments of the bypass waveguide 106, in which the bypass waveguide 106 has at least three different heights across different segments of the bypass waveguide 106.

Figure 14A:
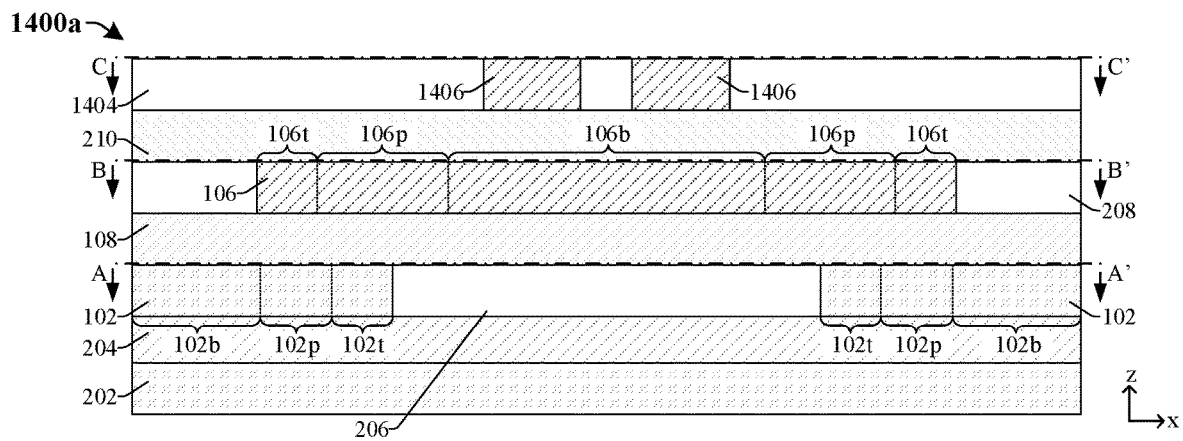
FIGS. 14A-14D illustrate various views of some embodiments of an optical module corresponding to some other embodiments of the optical module of FIGS. 2A-2C in which a plurality of upper transverse waveguides are coplanar with the bypass waveguides and a plurality of upper bypass waveguides overlie the bypass waveguides.
Figure 14B:
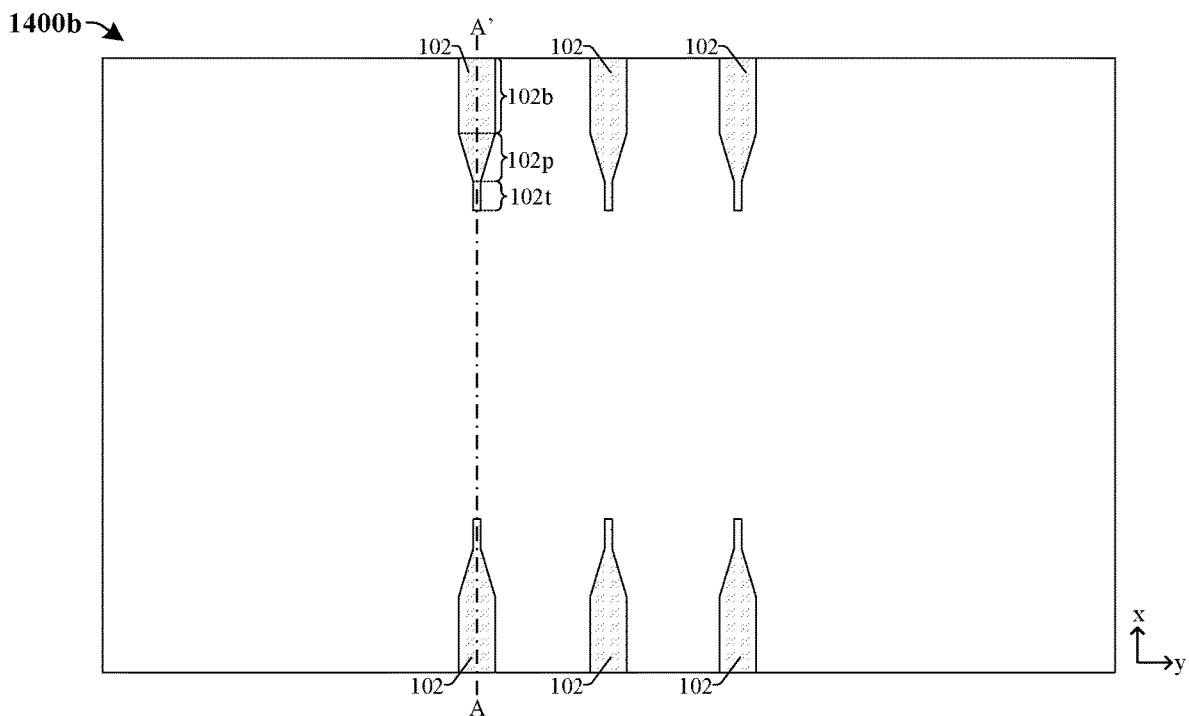
Figure 14C:
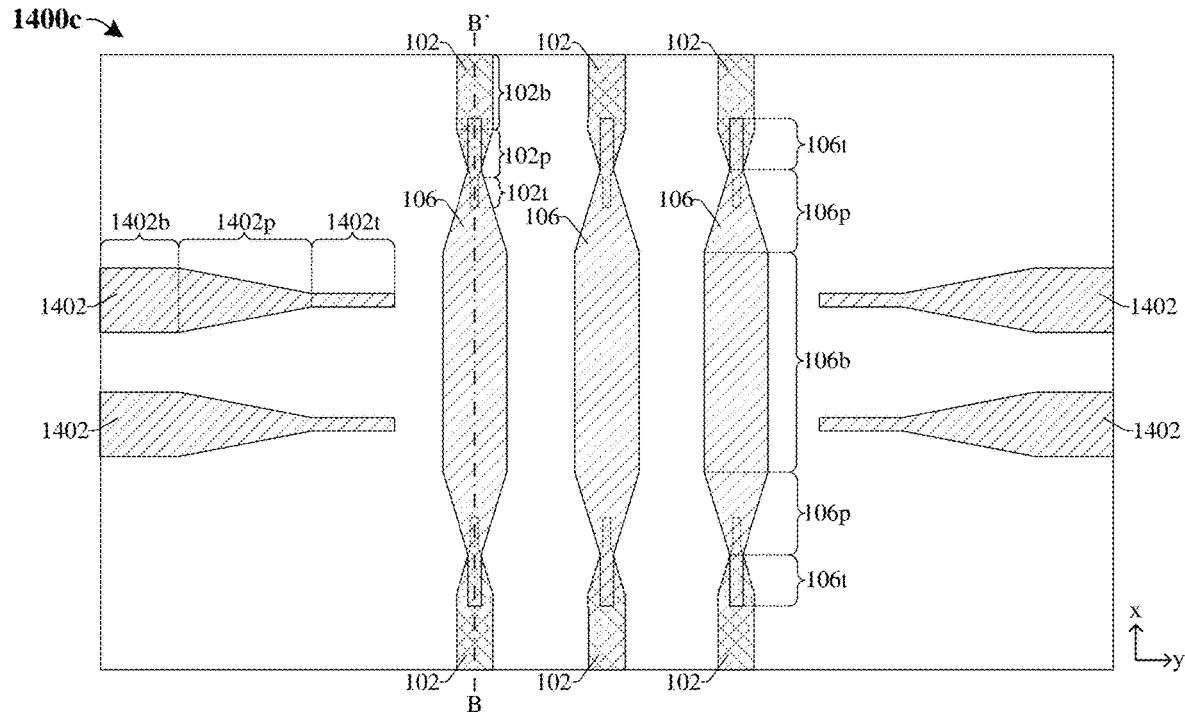
Figure 14D:
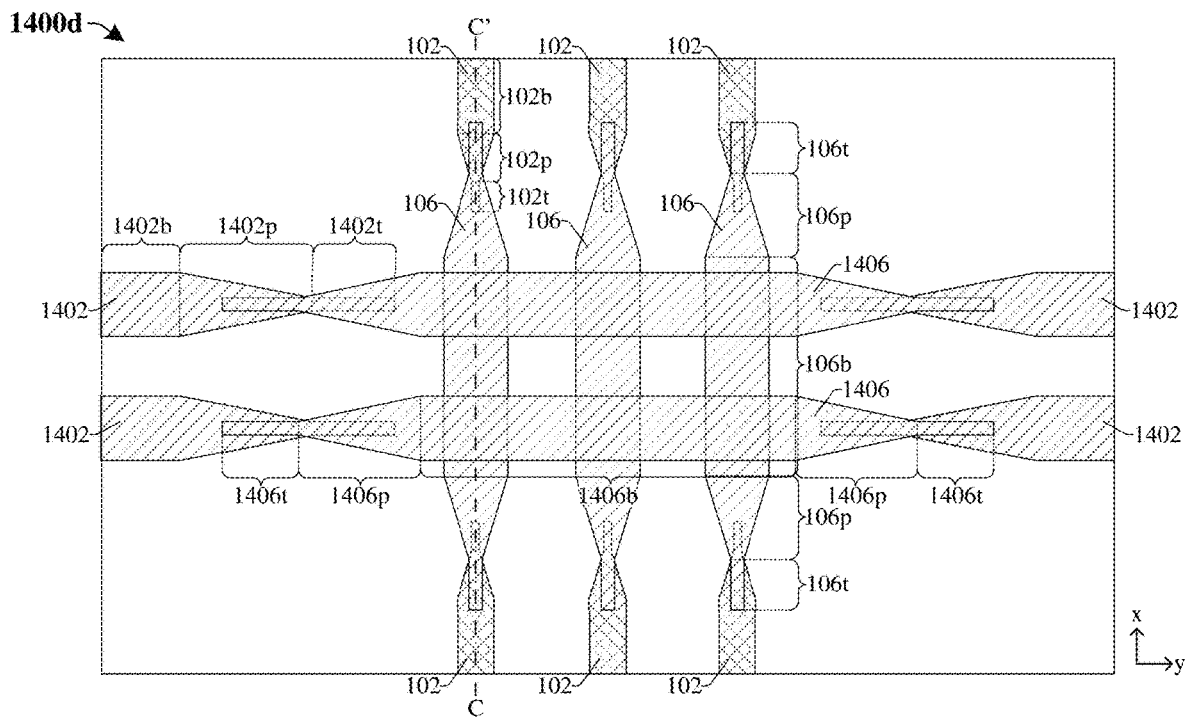

FIGS. 14A-14D illustrate various views of some embodiments of an optical module corresponding to some other embodiments of the optical module of FIGS. 2A-2C, in which a plurality of upper transverse waveguides 1402 are coplanar with the bypass waveguides 106 and a plurality of upper bypass waveguides 1406 directly overlie the bypass waveguides 106. FIG. 14A illustrates a cross-sectional view 1400a of some embodiments of the optical module. FIG. 14B illustrates a top view 1400b of some embodiments of the optical module taken along line A-A' of FIG. 14A. FIG. 14C illustrates a top view 1400c of some embodiments of the optical module taken along line B-B' of FIG. 14A, where various structures (e.g., first dielectric layer 108 and/or second cladding layer 208) are omitted from the top view 1400c. FIG. 14D illustrates a top view 1400d of some embodiments of the optical module taken along line C-C' of FIG. 14A, where various structures (e.g., first dielectric layer 108, second cladding layer 208, second dielectric layer 210, and/or third cladding layer 1404) are omitted from the top view 1400c.

In some embodiments, the plurality of upper transverse waveguides 1402 are disposed within the second cladding layer 208 and respectively comprise a transverse body segment 1402b, a transverse tapered segment 1402p, and a transverse tip segment 1402t. The plurality of upper bypass waveguides 1406 are disposed on the second dielectric layer 210. A third cladding layer 1404 overlies the second dielectric layer 210 and laterally wraps around the plurality of upper bypass waveguides 1406. The plurality of upper bypass waveguides 1406 respectively comprise a bypass body segment 1406b, bypass tapered segments 1406p disposed on opposing sides of the bypass body segment 1406b, and bypass tip segments 1406t abutting a corresponding bypass tapered segment 1406p. In various embodiments, the plurality of upper bypass waveguides 1406 are optically coupled to a corresponding pair of upper transverse waveguides in the plurality of upper transverse waveguides 1402. Accordingly, the upper bypass waveguides 1406 may facilitate transmission of optical signals at a region above the plurality of bypass waveguides 106. Thus, an optical transmission efficiency and overall performance of the optical module is increased. In some embodiments, the plurality of upper transverse waveguides 1402 and/or the plurality of upper bypass waveguides 1406 may, for example, be or comprise silicon nitride, polysilicon, amorphous silicon, a polymer, or some other suitable material.

Figure 15A:
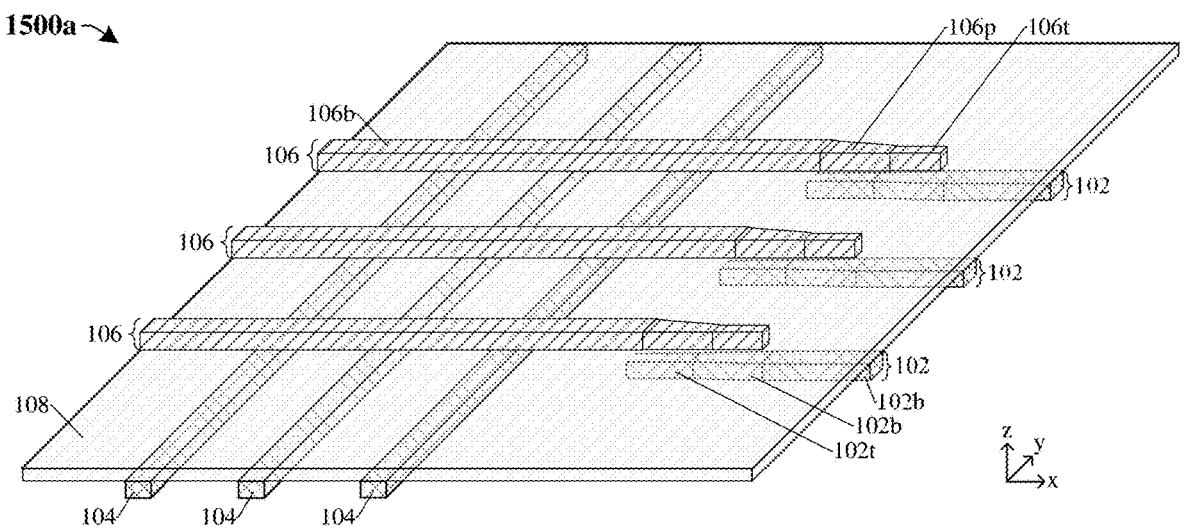
FIGS. 15A and 15B illustrate perspective views of other embodiments of the optical module of FIGS. 2A-2C.

FIG. 15A illustrates a perspective view 1500*a* of some embodiments of an optical module corresponding to some other embodiments of the optical module of FIGS. 2A-2C. As illustrated in the perspective view 1500*a*, a first dielectric layer 108 vertically separates a plurality of bypass waveguides 106 from a plurality of waveguides 102 and a plurality of transverse waveguides 104. It will be appreciated that the first dielectric layer 108 is at least partially transparent in the perspective view 1500*a*.

Figure 15B:
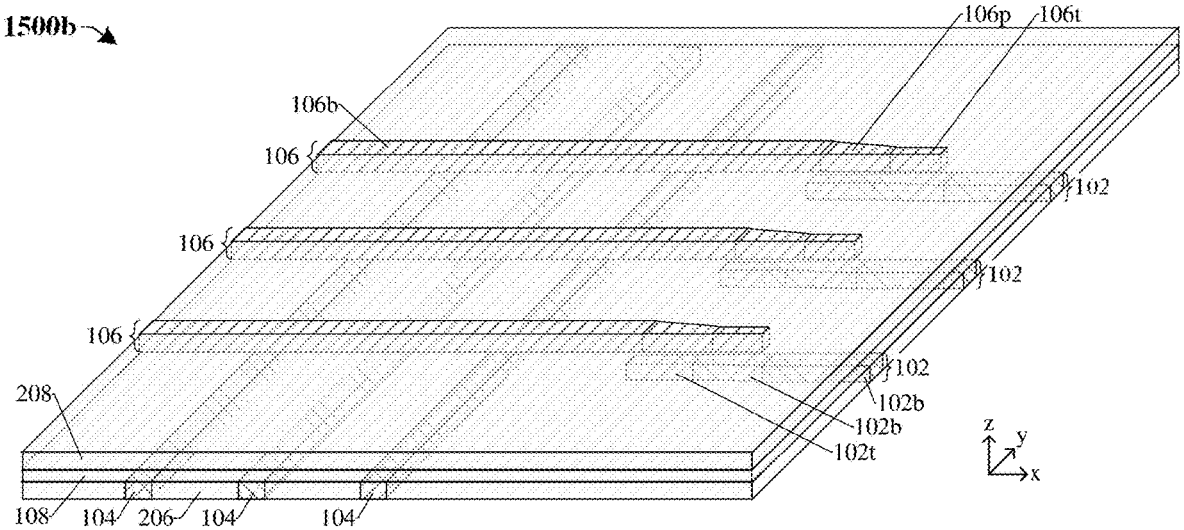

FIG. 15B illustrates a perspective view 1500*b* of some embodiments of an optical module corresponding to some other embodiments of the optical module of FIG. 15A, in which the plurality of waveguides 102 and the plurality of transverse waveguides 104 are disposed in a first cladding layer 206 and the plurality of bypass waveguides 106 are disposed in a second cladding layer 208. It will be appreciated that the first dielectric layer 108 and the first and second cladding layers 206, 208 are at least partially transparent in the perspective view 1500*b*.

Figure 16:
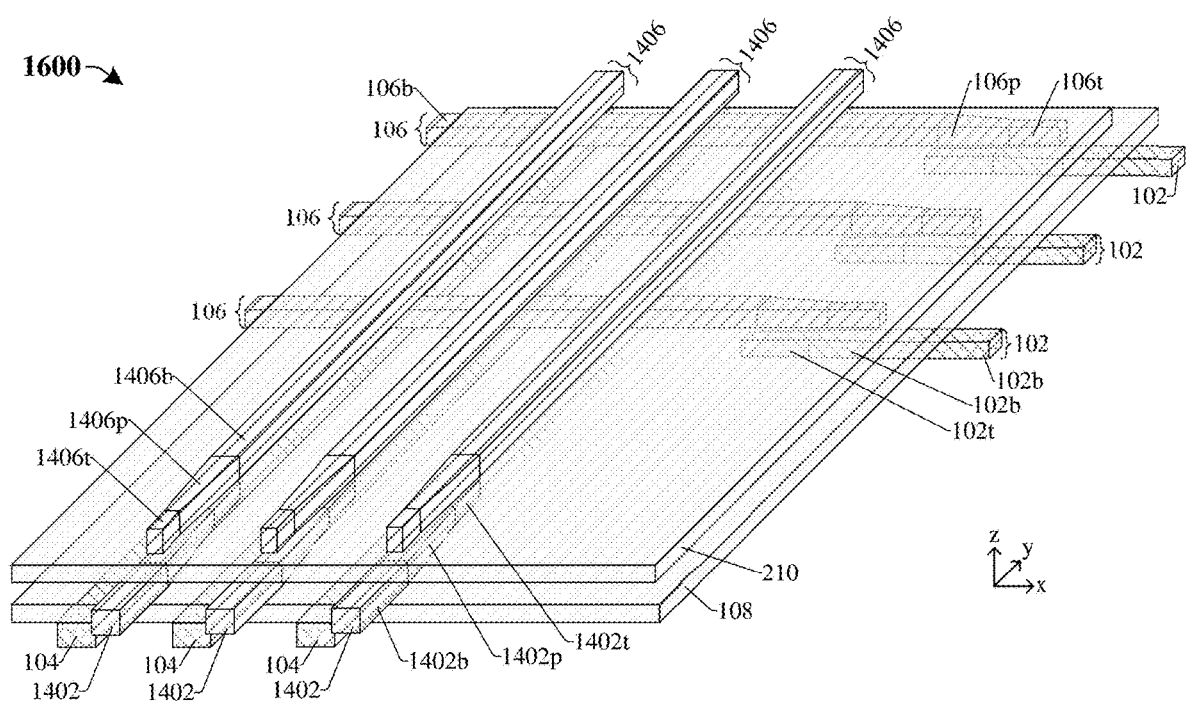
FIG. 16 illustrates a perspective view of other embodiments of the optical module of FIGS. 14A-14D.

FIG. 16 illustrates a perspective view 1600 of some embodiments of an optical module corresponding to some other embodiments of the optical module of FIGS. 14A-D, in which a first dielectric layer 108 vertically separates a plurality of bypass waveguides 106 from a plurality of waveguides 102 and a plurality of transverse waveguides 104. Further, a second dielectric layer 210 vertically separates a plurality of upper bypass waveguides 1406 from a plurality of upper transverse waveguides 1402 and the plurality of bypass waveguides 106.

FIGS. 17A-17B through 23A-23B illustrate various views of some embodiments of a method for forming an optical module comprising a plurality of bypass waveguides overlying a plurality of waveguides. Figures with a suffix of "A" illustrate a cross-sectional view of the optical module during various formation processes. Figures with a suffix of "B" illustrate a top view taken along the line A-A' of figures with a suffix of "A". Although the various views shown in FIGS. 17A-17B through 23A-23B are described with reference to a method of forming the optical module, it will be appreciated that the structures shown in FIGS. 17A-17B through 23A-23B are not limited to the method of formation but rather may stand alone as structures independent of the method.

Figure 17A:
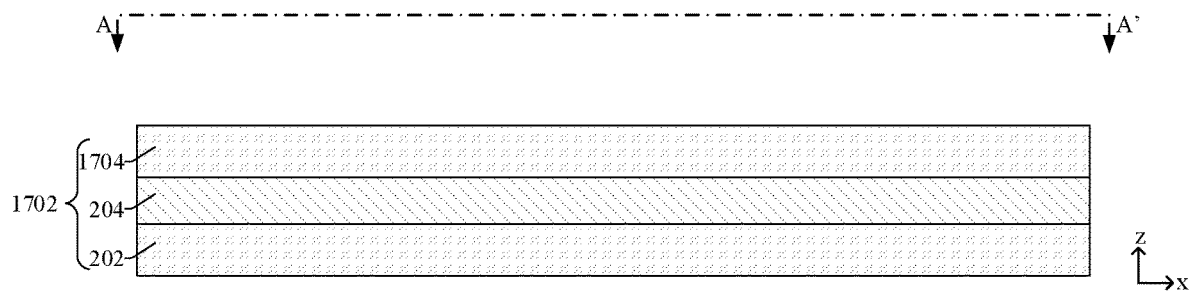
FIGS. 17A-17B through 23A-23B illustrate various views of some embodiments of a method for forming an optical module comprising a plurality of bypass waveguides overlying a plurality of waveguides.
Figure 17B:

As shown in cross-sectional view 1700*a* of FIG. 17A and top view 1700*b* of FIG. 17B, a semiconductor-on-insulator (SOI) 1702 is provided. The SOI 1702 includes an insulator layer 204 overlying a substrate 202 and a first layer 1704 over the bulk dielectric structure 204. The first layer 1704 may, for example, be or comprise silicon, intrinsic silicon, a crystalline silicon, some other suitable material, or the like. In some embodiments, the first layer 1704 has a height of about 270 nm, within a range of about 260 nm to about 290 nm, or some other suitable value.

Figure 18A:
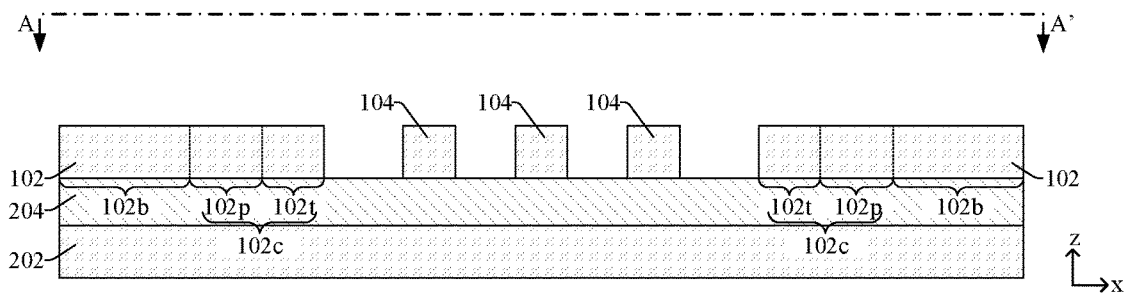
Figure 18B:
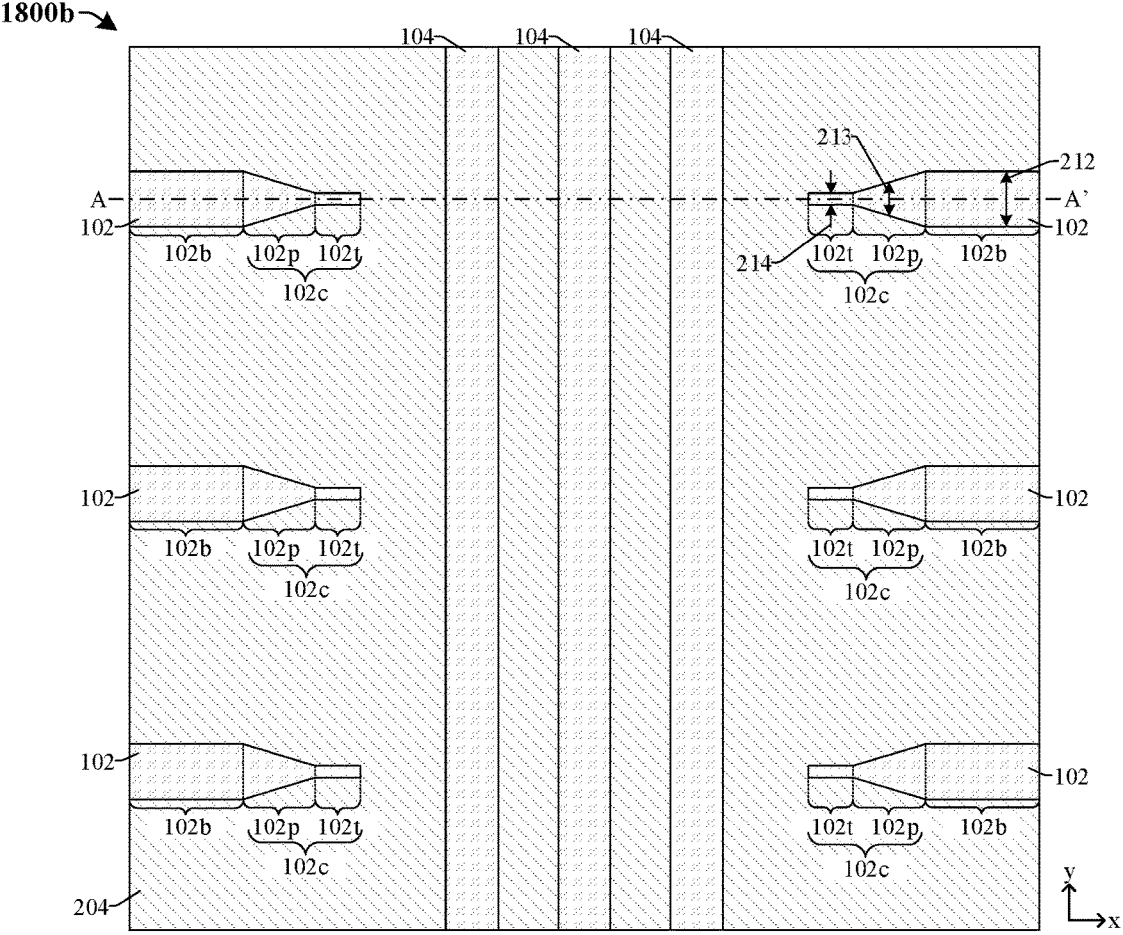

As shown in cross-sectional view 1800*a* of FIG. 18A and top view 1800*b* of FIG. 18B, a patterning process is performed on the first layer (1704 of FIGS. 17A-17B) to form a plurality of waveguides 102 laterally extending in a first direction (e.g., along the x-axis) and a plurality of transverse waveguides 104 laterally extending in a second direction (e.g., along the y-axis) different from the first direction. In some embodiments, the first direction is orthogonal to the second direction. In some embodiments, the patterning process includes forming a patterned masking layer (not shown) over the first layer (1704 of FIGS. 17A-17B) and performing an etching process on the first layer (1704 of FIGS. 17A-17B) according to the patterned masking layer. The etching process comprises, for example, a dry etch process (e.g., a plasma etching process, an ion beam etching process, or the like), a wet etch process, some other suitable etch process, or any combination of the foregoing. In some embodiments, the patterned masking layer is removed after and/or during the etching process. In further embodiments, the plurality of waveguides 102 and the plurality of transverse waveguides 104 comprise a first waveguide material (e.g., silicon, monocrystalline silicon, etc.) and are coplanar with one another. For example, top surfaces of the plurality of waveguides 102 are coplanar with top surface of the plurality of transverse waveguides 104.

In various embodiments, the patterning process is performed such that the plurality of waveguides 102 respectively comprise at least one waveguide coupler structure 102*c* abutting a corresponding waveguide body segment 102*b*. The waveguide coupler structure 102*c* comprises a waveguide tapered segment 102*p* and a waveguide tip segment 102*t*, where a width 213 of the waveguide tapered segment 102*p* decreases from the waveguide body segment 102*b* to the waveguide tip segment 102*t*. Further, a width 214 of the waveguide tip segment 102*t* is less than a width 212 of the waveguide body segment 102*b*. Further, it will be appreciated that while the waveguides 102 are illustrated as being formed as illustrated and/or described in FIGS. 2A-2C, the waveguides 102 may be formed to be configured as illustrated and/or described in any one of FIGS. 4A-4C, 6A-6C, 8A-8B, 10A-10C, or 12A-12B.

Figure 19A:
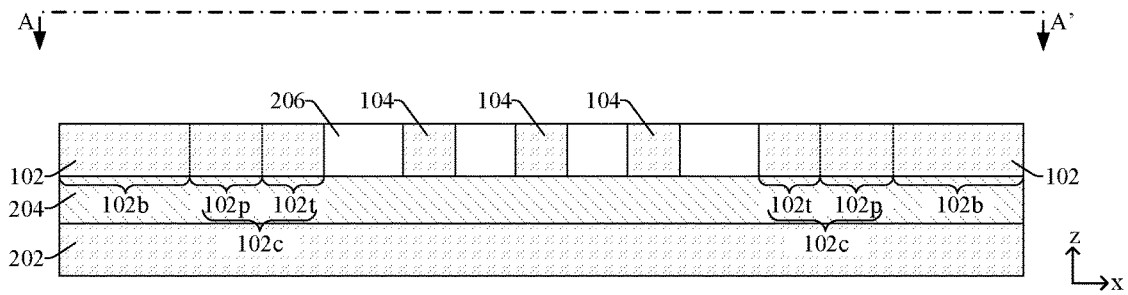
Figure 19B:
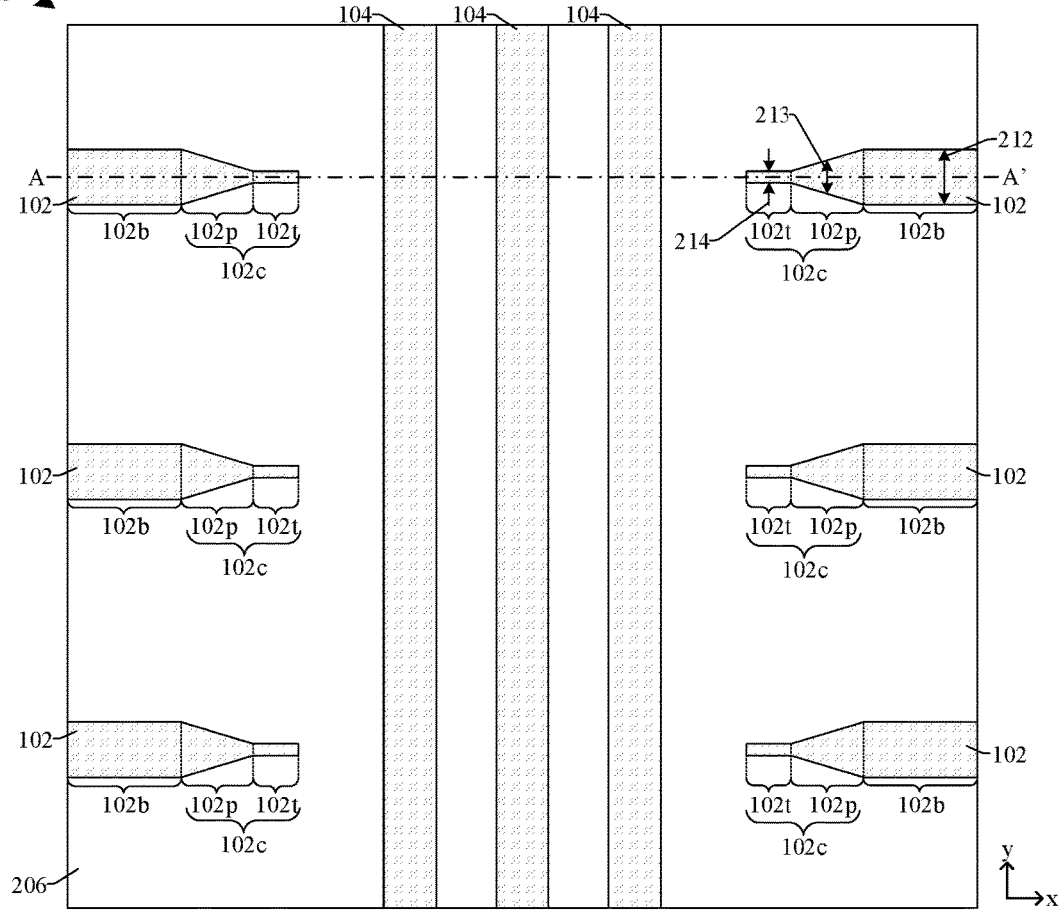

As shown in cross-sectional view 1900*a* of FIG. 19A and top view 1900*b* of FIG. 19B, a first cladding layer 206 is formed over the insulator layer 204 and the substrate 202. In some embodiments, a process for forming the first cladding layer 206 comprises depositing the first cladding layer 206 over the substrate 202. Further, a planarization process may be performed on the first cladding layer 206. The first cladding layer 206 may, for example, be deposited by a chemical vapor deposition (CVD) process, a physical vapor deposition (PVD) process, an atomic layer deposition (ALD) process, or some other suitable growth or deposition process. In some embodiments, the planarization process comprises a chemical mechanical planarization (CMP) process, an etching process, some other suitable planarization process, or any combination of the foregoing. In some embodiments, a top surface of the first cladding layer 206 is coplanar with the top surfaces of the waveguides 102 and the top surfaces of the transverse waveguides 104. Further, the first cladding layer 206 may, for example, be or comprise silicon dioxide, a metal oxide (e.g., hafnium oxide), some other suitable material, or any combination of the foregoing.

Figure 20A:
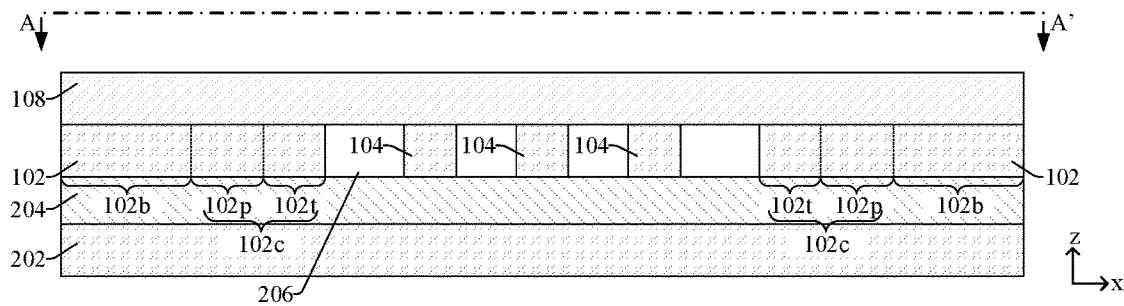
Figure 20B:
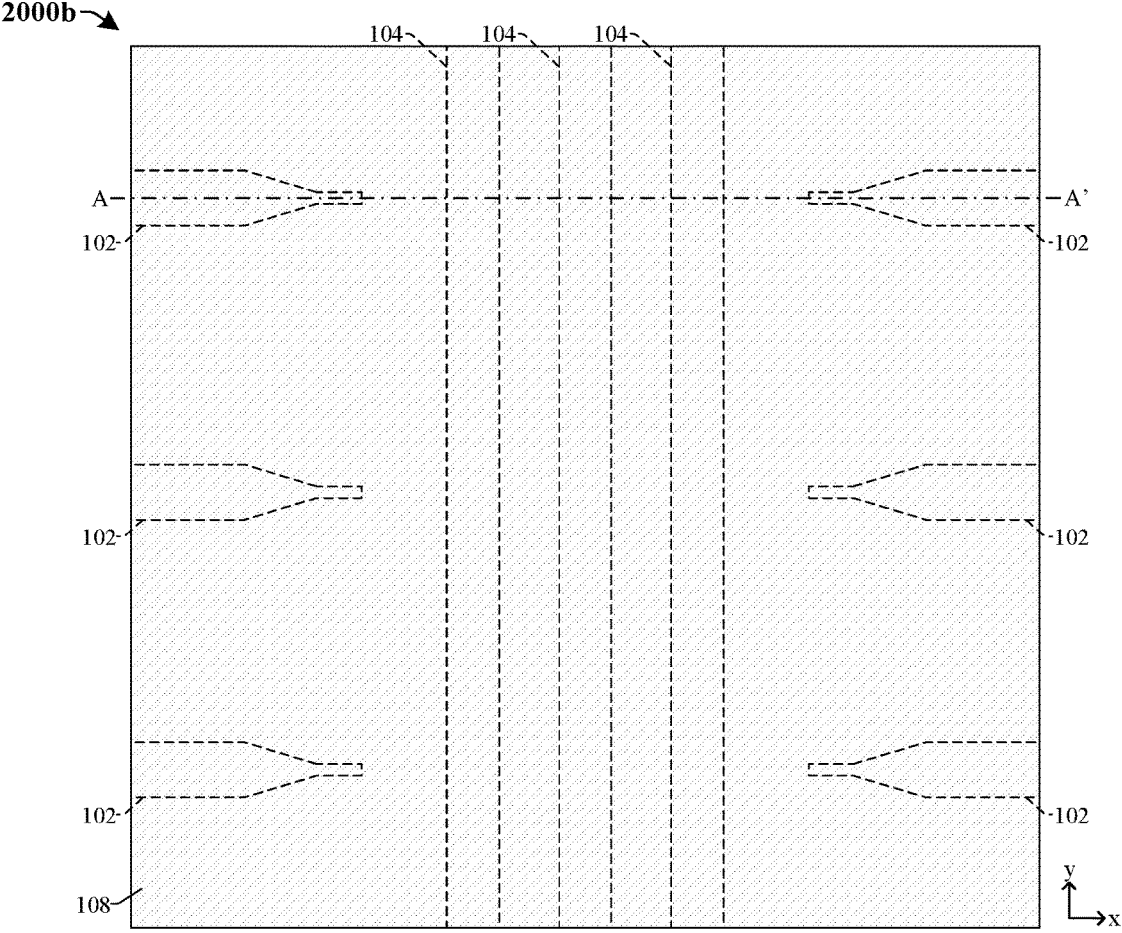

As shown in cross-sectional view 2000*a* of FIG. 20A and top view 2000*b* of FIG. 20B, a first dielectric layer 108 is formed over the first cladding layer 206, the plurality of waveguides 102, and the plurality of transverse waveguides 104. In some embodiments, a process for forming the first dielectric layer 108 comprises depositing the first dielectric layer 108 over the first dielectric layer 108 by a CVD process, a PVD process, an ALD process, or some other suitable growth or deposition process. The first dielectric layer 108 may, for example, be or comprise silicon dioxide, a metal oxide (e.g., hafnium oxide), another oxide, some other suitable material, or any combination of the foregoing. In some embodiments, the first dielectric layer 108 is formed to a height of about 300 nm, greater than 300 nm, or some other suitable value. In further embodiments, the height of the first dielectric layer 108 is greater than heights of the plurality of waveguides 102 and heights of the transverse waveguides 104.

Figure 21A:
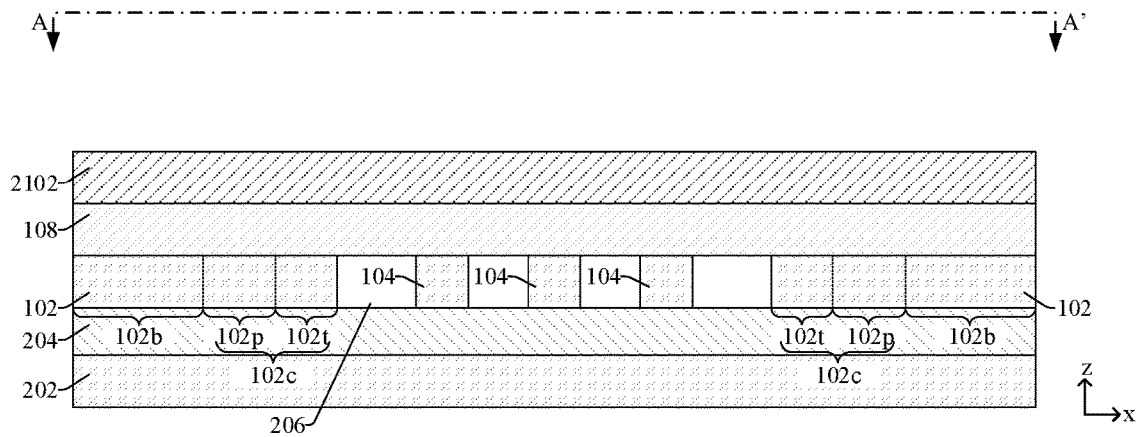
Figure 21B:
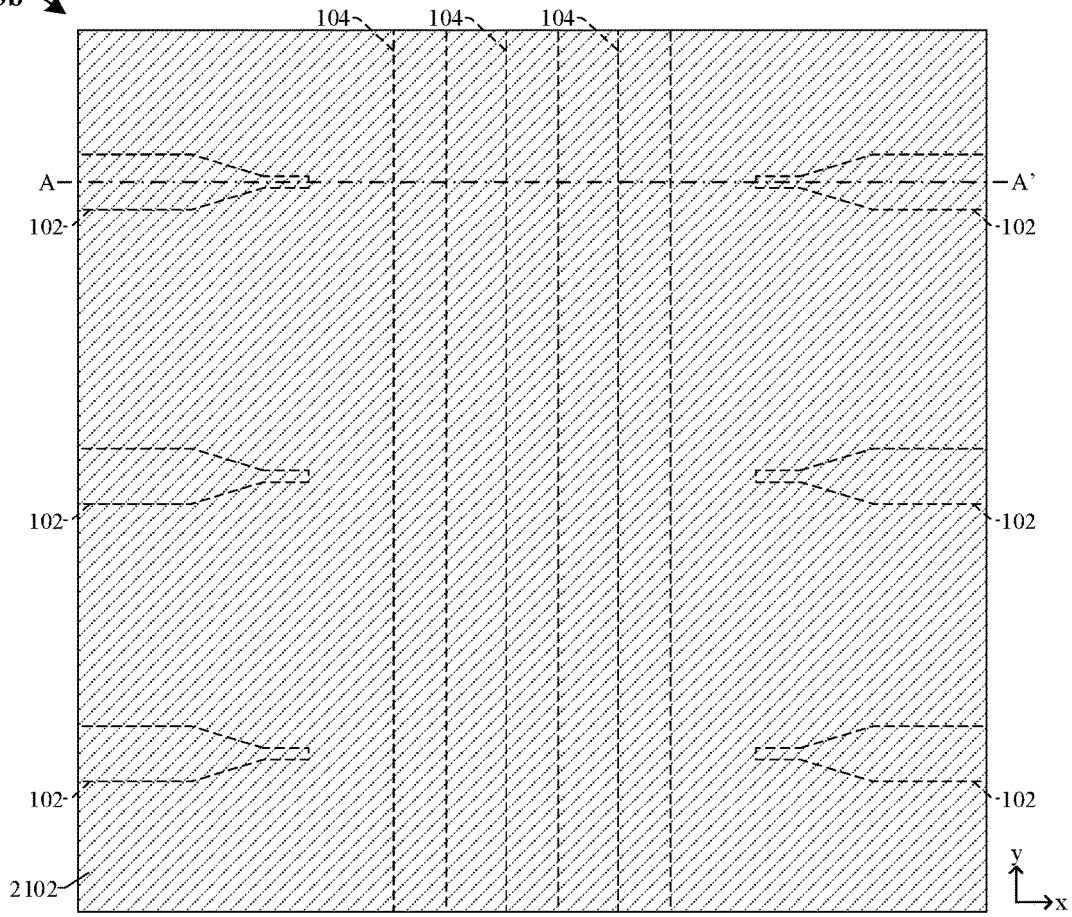

As shown in cross-sectional view 2100a of FIG. 21A and top view 2100b of FIG. 21B, a second layer 2102 is formed over the first dielectric layer 108. In some embodiments, a process for forming the second layer 2102 comprises depositing the second layer 2102 over the first dielectric layer 108 by a CVD process, a PVD process, an ALD process, an epitaxial process, or some other suitable growth or deposition process. The second layer 2102 may, for example, be or comprise silicon nitride, polysilicon, amorphous silicon, a polymer, or some other suitable material. In some embodiments, the second layer 2102 is formed to a height of about 300 nm, within a range of about 290 nm to about 310 nm, or some other suitable value.

Figure 22A:
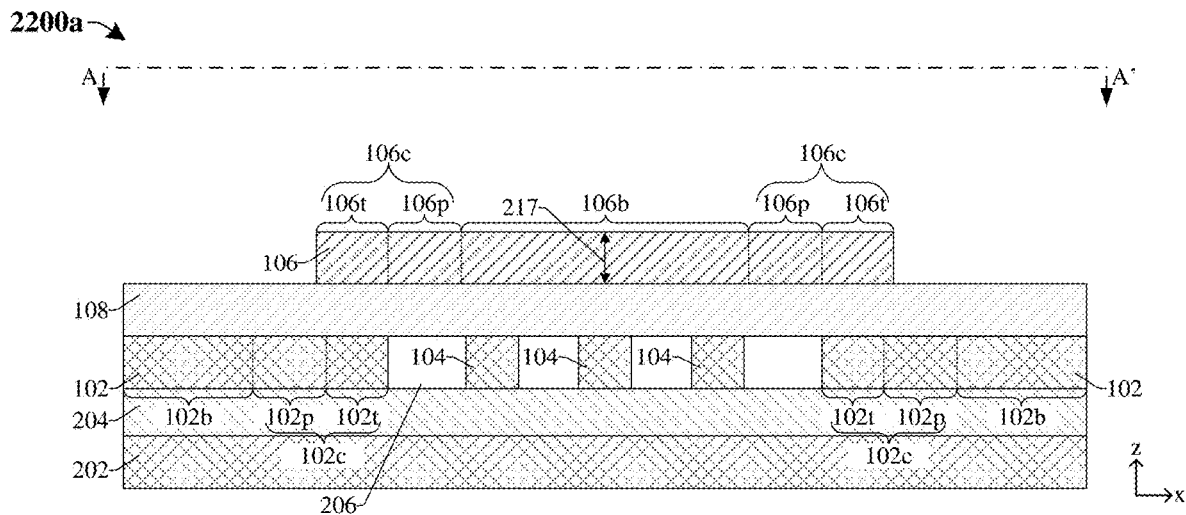
Figure 22B:
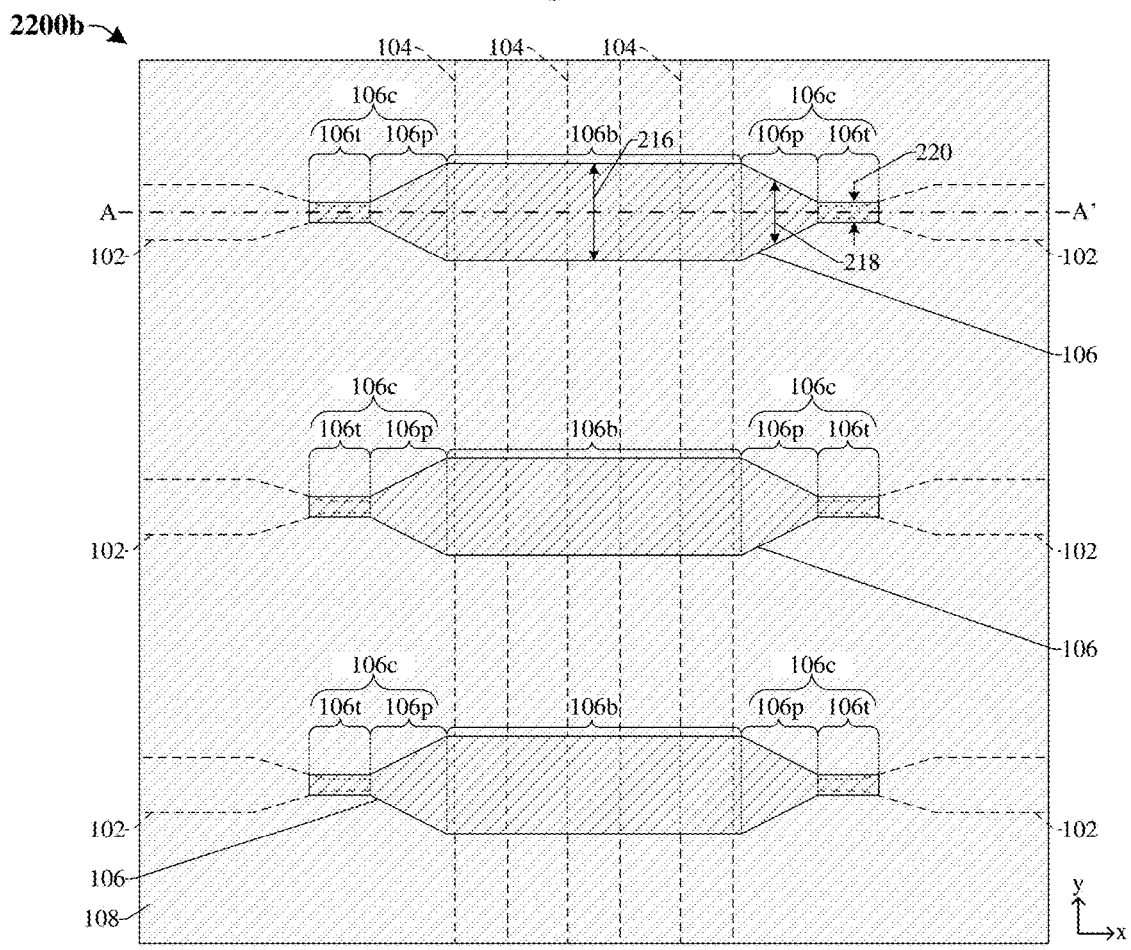

As shown in cross-sectional view 2200a of FIG. 22A and top view 2200b of FIG. 22B, a patterning process is performed on the second layer (2102 of FIGS. 21A-21B) to form a plurality of bypass waveguides 106 laterally extending in the first direction (e.g., along the x-axis) and vertically spaced from the waveguides 102 and the transverse waveguides 104. In some embodiments, the patterning process includes forming a patterned masking layer (not shown) over the second layer (2102 of FIGS. 21A-21B) and performing an etching process on the second layer (2102 of FIGS. 21A-21B) according to the patterned masking layer. The etching process comprises, for example, a dry etch process (e.g., a plasma etching process, an ion beam etching process, or the like), a wet etch process, some other suitable etch process, or any combination of the foregoing. In embodiments, the patterned masking layer is removed after and/or during the etching process. In further embodiments, the plurality of bypass waveguides 106 comprise a second waveguide material (e.g., silicon nitride, polysilicon, amorphous silicon, a polymer, etc.) different from the first waveguide material of the plurality of waveguides 102 and the plurality of transverse waveguides 104.

In various embodiments, the patterning process is performed such that the plurality of bypass waveguides respectively comprise bypass coupler structures 106c disposed on opposing sides of a corresponding bypass body segment 106b. The bypass coupler structures 106c respectively comprise a bypass tapered segment 106p and a bypass tip segment 106t, where a width 218 of the bypass tapered segment 106p decreases from the bypass body segment 106b in a direction towards a corresponding bypass tip segment 106t. Further, a width 220 of the bypass tip segment 106t is less than a width 216 of the bypass body segment 106b. The bypass coupler structures 106c at least partially directly overlie a corresponding waveguide coupler structure 102c of an underlying waveguide 102. This, in part, facilitates optical coupling between an individual bypass waveguide in the plurality of bypass waveguides 106 with a corresponding pair of waveguides in the plurality of waveguides 102. Further, it will be appreciated that while the bypass waveguides 106 are illustrated as being formed as illustrated and/or described in FIGS. 2A-2C, the bypass waveguides 106 may be formed to be configured as illustrated and/or described in any one of FIGS. 5A-5C, 7A-7C, 9A-9B, 11A-11C, or 13A-13B.

Figure 23A:
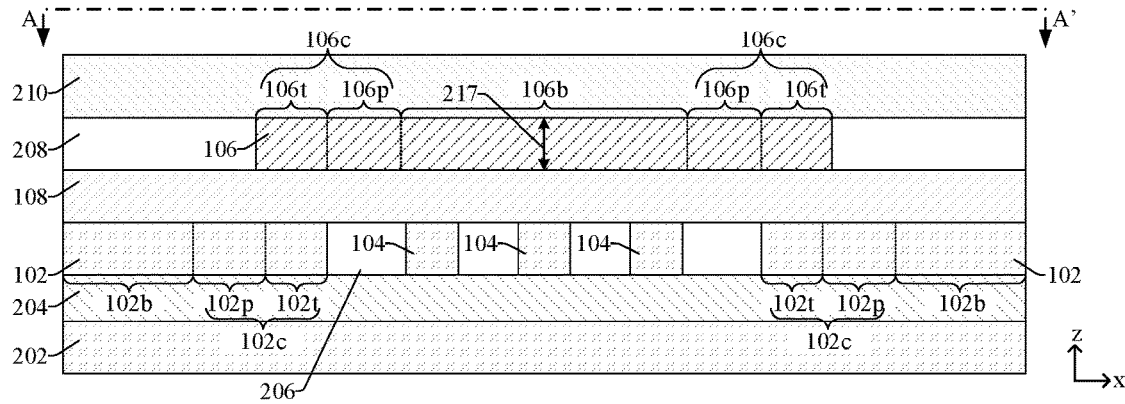
Figure 23B:
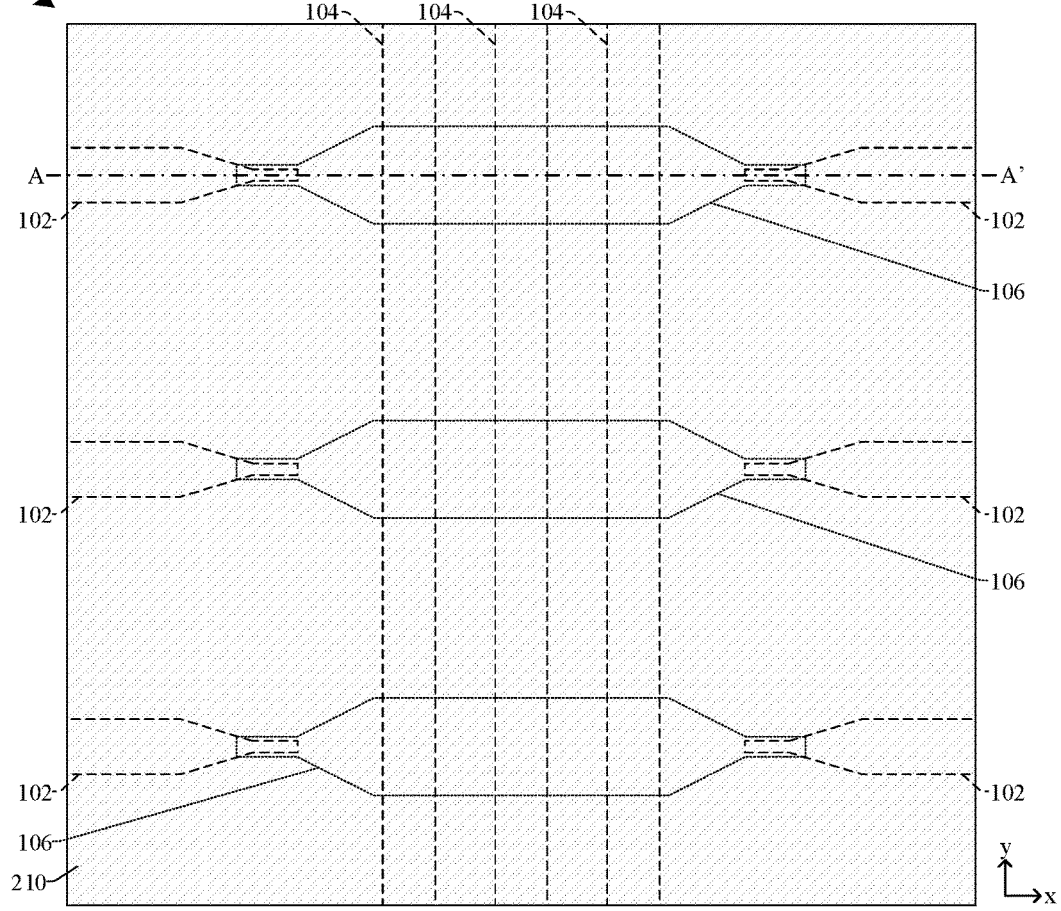

As shown in cross-sectional view 2300a of FIG. 23A and top view 2300b of FIG. 23B, a second cladding layer 208 is formed over the first dielectric layer 108 and a second dielectric layer 210 is formed over the plurality of bypass waveguides 106. In some embodiments, a process for forming the second cladding layer 208 comprises depositing the second cladding layer 208 over the first dielectric layer 108 by, for example, a CVD process, a PVD process, an ALD process, or some other suitable growth or deposition process. Further, a planarization process (e.g., a CMP process, an etching process, etc.) may be performed on the second cladding layer 208 such that a top surface of the second cladding layer 208 is coplanar with top surfaces of the bypass waveguides 106. In some embodiments, a process for forming the second dielectric layer 210 comprises depositing the second dielectric layer 210 over the plurality of bypass waveguides 106 by, for example, a CVD process, a PVD process, an ALD process, or some other suitable growth or deposition process. The second cladding layer 208 and/or the first dielectric layer 108 may, for example, be or comprise silicon dioxide, a metal oxide (e.g., hafnium oxide, another oxide, some other suitable material, or any combination of the foregoing.

FIG. 24 illustrate a flow diagram of some embodiments of a method 2400 for forming an optical module comprising a plurality of bypass waveguides overlying a plurality of waveguides. Although the method 2400 is illustrated and/or described as a series of acts or events, it will be appreciated that the method is not limited to the illustrated ordering of acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 2402, a semiconductor-on-insulator (SOI) is provided, where the SOI has a first layer separated from a substrate by an insulator layer. FIGS. 17A-17B illustrate various views of some embodiments corresponding to act 2402.

At act 2404, the first layer is patterned to form a plurality of waveguides laterally extending in a first direction and a plurality of transverse waveguides laterally extending in a second direction different from the first direction. The plurality of waveguides respectively comprise a waveguide coupler structure abutting a waveguide body segment. FIGS. 18A-18B illustrate various views of some embodiments corresponding to act 2404.

At act 2406, a first dielectric layer is deposited over the plurality of waveguides and the plurality of transverse waveguides. FIGS. 20A-20B illustrate various views of some embodiments corresponding to act 2406.

At act 2408, a second layer is deposited over the first dielectric layer. FIG. 21A-21B illustrate various views of some embodiments corresponding to act 2408.

At act 2410, the second layer is patterned to form a plurality of bypass waveguides laterally extending in the first direction and overlying the plurality of waveguides and the plurality of transverse waveguides. The plurality of bypass waveguides respectively comprise at least one bypass waveguide abutting a bypass body segment and directly overlying a corresponding waveguide coupler structure of an underlying waveguide. FIGS. 22A-22B illustrate various views of some embodiments corresponding to act 2410.

At act 2412, a second dielectric layer is formed over the plurality of bypass waveguides. FIGS. 23A-23B illustrate various views of some embodiments corresponding to act 2412.

Accordingly, in some embodiments, the present disclosure relates to an optical module including a bypass waveguide vertically offset from a waveguide, where the bypass waveguide comprises a waveguide coupler structure directly overlying and optically coupled to a waveguide coupler structure of the waveguide.

In some embodiments, the present application provides an optical module including: a first waveguide laterally extending in a first direction, wherein the first waveguide comprises a first waveguide body segment and a first waveguide coupler structure; a transverse waveguide laterally extending in a second direction different from the first direction; a first dielectric layer disposed over the first waveguide and the transverse waveguide; and a bypass waveguide overlying the first dielectric layer, wherein the bypass waveguide laterally extends in the first direction, wherein the bypass waveguide comprises a bypass body segment and a first bypass coupler structure, wherein at least a portion of the first bypass coupler structure overlies the first waveguide coupler structure, and wherein the bypass body segment overlies at least a portion of the transverse waveguide.

In some embodiments, the present application provides a semiconductor structure including: a first waveguide disposed within a first cladding layer, wherein the first waveguide comprises a first waveguide body segment elongated in a first direction, a first waveguide tapered segment abutting the first waveguide body segment, and a first waveguide tip segment abutting the first waveguide tapered segment, wherein the first waveguide body segment has a first height; a transverse waveguide disposed within the first cladding layer and elongated in a second direction orthogonal to the first direction, wherein the first waveguide is laterally offset from the transverse waveguide by a non-zero distance; a first dielectric layer disposed along top surfaces of the first waveguide and the transverse waveguide, wherein the first dielectric layer has a second height; a second cladding layer disposed on the first dielectric layer; and a bypass waveguide disposed within the second cladding layer, wherein the bypass waveguide comprises a bypass body segment elongated in the first direction, a bypass tapered segment abutting the bypass body segment, and a bypass tip segment abutting the bypass tapered segment, wherein the bypass body segment has a third height, wherein at least a portion of the bypass body segment is spaced above the transverse waveguide, wherein at least a portion of the bypass tip segment directly overlies the first waveguide tip segment and/or the first waveguide tapered segment, wherein the portion of the bypass tip segment is vertically spaced from the first waveguide by the second height, wherein the second height is greater than the first height and the third height.

In some embodiments, the present application provides a method for forming an optical module, the method includes: performing a first patterning process on a first semiconductor layer to form a first waveguide laterally extending in a first direction and a transverse waveguide laterally extending in a second direction different from the first direction, wherein the first waveguide comprises a first waveguide body segment and a first waveguide coupler structure; depositing a first dielectric layer over the transverse waveguide and the first waveguide; depositing a second semiconductor layer on the first dielectric layer; and performing a second patterning process on the second semiconductor layer to form a bypass waveguide laterally extending in the first direction, wherein the bypass waveguide comprises a bypass body segment and a bypass coupler structure, wherein at least a portion of the bypass body segment overhangs the transverse waveguide, and wherein at least a portion of the bypass coupler structure directly overlies the first waveguide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical module, comprising:
a first waveguide laterally extending in a first direction, wherein the first waveguide comprises a first waveguide body segment and a first waveguide coupler structure, wherein the first waveguide coupler structure comprises a waveguide tip segment having a first width less than a second width of the first waveguide body segment;
a transverse waveguide laterally extending in a second direction different from the first direction;
a first dielectric layer disposed over the first waveguide and the transverse waveguide; and
a bypass waveguide overlying the first dielectric layer, wherein the bypass waveguide laterally extends in the first direction, wherein the bypass waveguide comprises a bypass body segment and a first bypass coupler structure, wherein at least a portion of the first bypass coupler structure overlies the waveguide tip segment, and wherein the bypass body segment overlies at least a portion of the transverse waveguide.

2. The optical module of claim 1, wherein the first waveguide comprises a first material and the bypass waveguide comprises a second material different from the first material.

3. The optical module of claim 1, wherein a top surface of the transverse waveguide is coplanar with a top surface of the first waveguide.

4. The optical module of claim 1, wherein the transverse waveguide is laterally offset from the first waveguide by a non-zero distance.

5. The optical module of claim 1, further comprising:
a second waveguide laterally extending in the first direction, wherein the second waveguide comprises a second waveguide body segment and a second waveguide coupler structure, wherein the transverse waveguide is disposed laterally between the first and second waveguides; and
wherein the bypass waveguide further comprises a second bypass coupler structure, wherein the bypass body segment continuously laterally extends between the first and second bypass coupler structures, wherein at least a portion of the second bypass coupler structure directly overlies the second waveguide coupler structure.

6. The optical module of claim 1, wherein the first waveguide coupler structure comprises a waveguide tapered segment directly between the first waveguide body segment and the waveguide tip segment, wherein the first bypass coupler structure comprises a bypass tip segment and a bypass tapered segment directly between the bypass body segment and the bypass tip segment, wherein at least a portion of the bypass tip segment directly overlies the waveguide tapered segment, and wherein at least a portion of the bypass tapered segment directly overlies the waveguide tip segment.

7. The optical module of claim 6, wherein a width of the bypass body segment is greater than the second width of the first waveguide body segment, wherein a width of the bypass tip segment is greater than the first width of the waveguide tip segment, and wherein a length of the bypass tapered segment is greater than a length of the waveguide tapered segment.

8. The optical module of claim 1, wherein the first waveguide is configured to transmit an optical signal along the first waveguide body segment to the first waveguide coupler structure, wherein the bypass waveguide is configured to receive the optical signal from the first waveguide coupler structure at the first bypass coupler structure and transmit the optical signal along the bypass body segment.

9. The optical module of claim 8, wherein the first waveguide coupler structure is configured to transmit the optical signal through the first dielectric layer to the first bypass coupler structure.

10. A semiconductor structure, comprising:
a first waveguide disposed within a first cladding layer, wherein the first waveguide comprises a first waveguide body segment elongated in a first direction, a first waveguide tapered segment abutting the first waveguide body segment, and a first waveguide tip segment abutting the first waveguide tapered segment, wherein the first waveguide body segment has a first height;
a transverse waveguide disposed within the first cladding layer and elongated in a second direction orthogonal to the first direction, wherein the first waveguide is laterally offset from the transverse waveguide by a non-zero distance;
a first dielectric layer disposed along top surfaces of the first waveguide and the transverse waveguide, wherein the first dielectric layer has a second height;
a second cladding layer disposed on the first dielectric layer; and
a bypass waveguide disposed within the second cladding layer, wherein the bypass waveguide comprises a bypass body segment elongated in the first direction, a bypass tapered segment abutting the bypass body segment, and a bypass tip segment abutting the bypass tapered segment, wherein the bypass body segment has a third height, wherein at least a portion of the bypass body segment is spaced above the transverse waveguide, wherein at least a portion of the bypass tip segment directly overlies the first waveguide tip segment and/or the first waveguide tapered segment, wherein the portion of the bypass tip segment is vertically spaced from the first waveguide by the second height, wherein the second height is greater than the first height and the third height.

11. The semiconductor structure of claim 10, wherein a width of the first waveguide tapered segment decreases from the first waveguide body segment along the first direction towards the first waveguide tip segment.

12. The semiconductor structure of claim 10, wherein the first waveguide tapered segment has a fourth height less than the first height.

13. The semiconductor structure of claim 12, wherein the first waveguide tip segment has a fifth height less than the fourth height.

14. The semiconductor structure of claim 10, wherein the first waveguide tip segment and the bypass tip segment respectively comprise a plurality of grating tip elements laterally spaced from one another along the first direction.

15. The semiconductor structure of claim 14, wherein lengths of the grating tip elements are equal to one another.

16. The semiconductor structure of claim 15, wherein the first waveguide tapered segment and the bypass tapered segment respectively comprise a plurality of tapered grating elements laterally spaced from one another along the first direction.

17. A method for forming an optical module, the method comprising:
performing a first patterning process on a first layer to form a first waveguide laterally extending in a first direction and a transverse waveguide laterally extending in a second direction different from the first direction, wherein the first waveguide comprises a first waveguide body segment and a first waveguide coupler structure;
depositing a first dielectric layer over the transverse waveguide and the first waveguide;
depositing a second layer on the first dielectric layer; and
performing a second patterning process on the second layer to form a bypass waveguide laterally extending in the first direction, wherein the bypass waveguide comprises a bypass body segment and a bypass coupler structure, wherein the bypass coupler structure comprises a bypass tip segment having a width less than a width of the bypass body segment, wherein at least a portion of the bypass body segment overhangs the transverse waveguide, and wherein at least a portion of the bypass tip segment overlies the first waveguide.

18. The method of claim 17, wherein the bypass coupler structure is laterally offset from the transverse waveguide by a non-zero distance.

19. The method of claim 17, further comprising:
forming a first cladding layer around the first waveguide and the transverse waveguide; and
forming a second cladding layer over the first dielectric layer and around the bypass waveguide.

20. The method of claim 17, wherein a height of the first dielectric layer is greater than heights of the bypass waveguide and the first waveguide.

* * * * *